United States Patent [19]

Pang

[11] Patent Number: 5,696,994

[45] Date of Patent: Dec. 9, 1997

[54] SERIAL INTERFACE HAVING CONTROL CIRCUITS FOR ENABLING OR DISABLING N-CHANNEL OR P-CHANNEL TRANSISTORS TO ALLOW FOR OPERATION IN TWO DIFFERENT TRANSFER MODES

[75] Inventor: Jianhua Pang, Arlington, Tex.

[73] Assignee: National Semiconductor Corporation, Santa Clara, Calif.

[21] Appl. No.: 451,965

[22] Filed: May 26, 1995

[51] Int. Cl.⁶ ................................................ G06F 13/00
[52] U.S. Cl. ...................... 395/884; 395/551; 395/851; 395/881; 395/883; 327/334; 327/365; 327/389; 327/427
[58] Field of Search ........................... 395/878, 884, 395/885, 551, 851, 881, 883; 327/334, 365, 389, 427

[56] References Cited

U.S. PATENT DOCUMENTS

| | | | |
|---|---|---|---|
| 3,952,253 | 4/1976 | DeVolpi et al. | 327/160 |
| 4,275,354 | 6/1981 | Suematsu et al. | 328/58 |
| 4,330,751 | 5/1982 | Swain | 328/61 |
| 4,490,631 | 12/1984 | Kung | 326/26 |
| 4,870,665 | 9/1989 | Vaughn | 328/61 |
| 4,958,362 | 9/1990 | Nishibe et al. | 377/20 |
| 5,065,042 | 11/1991 | Thomsen et al. | 307/269 |
| 5,189,319 | 2/1993 | Fung et al. | 307/452 |
| 5,204,953 | 4/1993 | Dixit | 395/400 |
| 5,254,888 | 10/1993 | Lee et al. | 307/480 |
| 5,259,006 | 11/1993 | Price et al. | 375/107 |
| 5,404,473 | 4/1995 | Papworth et al. | 395/375 |
| 5,408,626 | 4/1995 | Dixit | 395/400 |

FOREIGN PATENT DOCUMENTS

| | | |
|---|---|---|
| 0427137 | 5/1991 | European Pat. Off. . |
| 2342585 | 9/1977 | France ............ H03K 5/04 |
| 3213010 | 9/1991 | Japan ............ 327/298 |

OTHER PUBLICATIONS

Serra, Micaela & Dervisoglu, Bulent I, "Testing", Chapter 79, *The Electrical Engineering Handbook*, Richard C. Dorf, Editor-in-Chief, pp. 1808–1837, CRC Press.

L-T Wang et al., "Feedback Shift Registers For Self-Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power–On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh K., *80×86 Architecture and Programming, vol. II: Architecture Reference*, Chapter 4, Prentice Hall, 1991, pp. 542–543.

(List continued on next page.)

*Primary Examiner*—Thomas C. Lee
*Assistant Examiner*—Po C. Huang
*Attorney, Agent, or Firm*—Limbach & Limbach L.L.P.

[57] ABSTRACT

A serial interface includes a first port capable of transmitting and receiving data in a serial fashion. A first p-channel transistor is coupled to the a first port. A first n-channel transistor is coupled to the a first port. A first control circuit is coupled to the first p-channel transistor for disabling the first p-channel transistor so that the first port can operate in a first serial data transfer mode wherein the first n-channel transistor operates in an open-drain fashion. A second port is capable of transmitting and receiving a clock signal which is used to control data transfer through the first port. A second p-channel transistor is coupled to the a second port. A second n-channel transistor is coupled to the a second port. A second control circuit is coupled to the second p-channel transistor for disabling the second p-channel transistor so that the second port can operate in the first serial data transfer mode wherein the second n-channel transistor operates in an open-drain fashion.

11 Claims, 27 Drawing Sheets

OTHER PUBLICATIONS

Intel486 Microprocessor Family Programmer's Reference Manual, Intel Corporation, 1993.

"8237A High Performance Programmable DMA Controller (8237A, 8237A-4, 8237A-5)", *Peripheral Components,* Intel, 1992, pp. 3-14 thru 3-50.

Kane, Gerry, "R2000 Processor Programming Model", Chapter 2, *MIPS RISC Architecture,* MIPS Computer Systems, Inc.

Hennessy, John, et al., "Interpreting Memory Addresses", *Computer Architecture A Quantitative Approach,* pp. 95-97, Morgan Kaufmann Publishers, Inc. 1990.

*PowerPC601 Reference Manual,* IBM, 1994, Chapter 9, "System Interface Operation", pp. 9-15 thru 9-17.

Intel Corp. Microsoft Corp., *Advanced Power Management (APM) BIOS Interface Specification,* Revision 1.1, Sep. 1993.

Intel Corporation, *i486 Micro Processor Hardware Reference Manual,* Processor Bus, pp. 3-28 thru 3-32.

National Semiconductor Corp., "LMC6980/84/88 Fuel Gauge and Charge Control Solution", Amplifier Applications Handbook, date unknown, pp. 1-66 through 1-71.

FIG. 19 Open Drain Multi-master Clock Generator

FIG. 28

SERIAL INTERFACE HAVING CONTROL CIRCUITS FOR ENABLING OR DISABLING N-CHANNEL OR P-CHANNEL TRANSISTORS TO ALLOW FOR OPERATION IN TWO DIFFERENT TRANSFER MODES

BACKGROUND OF THE INVENTION

1. Field of the Invention

The present invention relates to serial interfaces, and more particularly, to a serial interface capable of operating with two or more interface standards.

2. Description of the Related Art

Two types of synchronous serial interface data transfer standards are the MICROWIRE™/Microwire Plus standard and the System Management Bus (SMB) standard. The MICROWIRE™/Microwire Plus standard is a three wire standard, and the SMB standard is a two wire standard. The SMB standard, which is published by Intel Corporation of Santa Clara, Calif., is substantially equivalent to another standard known as the I²C bus standard. Furthermore, the SMB Bus standard is similar to another standard known as the Access.bus standard. These interface standards permit easy interfacing to a wide range of low-cost specialty memories and I/O devices. These include EEPROMs, SRAMs, timers, A/O) converters, D/A converters, clock chips, and peripheral drivers.

In order to include both MICROWIRE™/Microwire Plus and SMB standard interfaces in a single integrated circuit (IC) chip, five input/output pins must be used, i.e., three pins for MICROWIRE™/Microwire Plus and two pins for SMB. In applications which have limitations on space and cost, such as high-end personal digital assistant (PDA) applications, five input/output pins uses a significant amount of space.

Thus, there is a need for a circuit which can combine two or more serial interfaces and which uses relatively few input/output pins.

SUMMARY OF THE INVENTION

The present invention provides a serial interface. The serial interface includes a first port capable of transmitting and receiving data in a serial fashion. A first stage is coupled to the first port for configuring the first port to operate in a first serial data transfer mode and a second serial data transfer mode. A second port is capable of transmitting and receiving a clock signal which is used to control data transfer through the first port. A second stage is coupled to the second port for configuring the second port to operate in the first serial data transfer mode and the second serial data transfer mode.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

Figure 28:
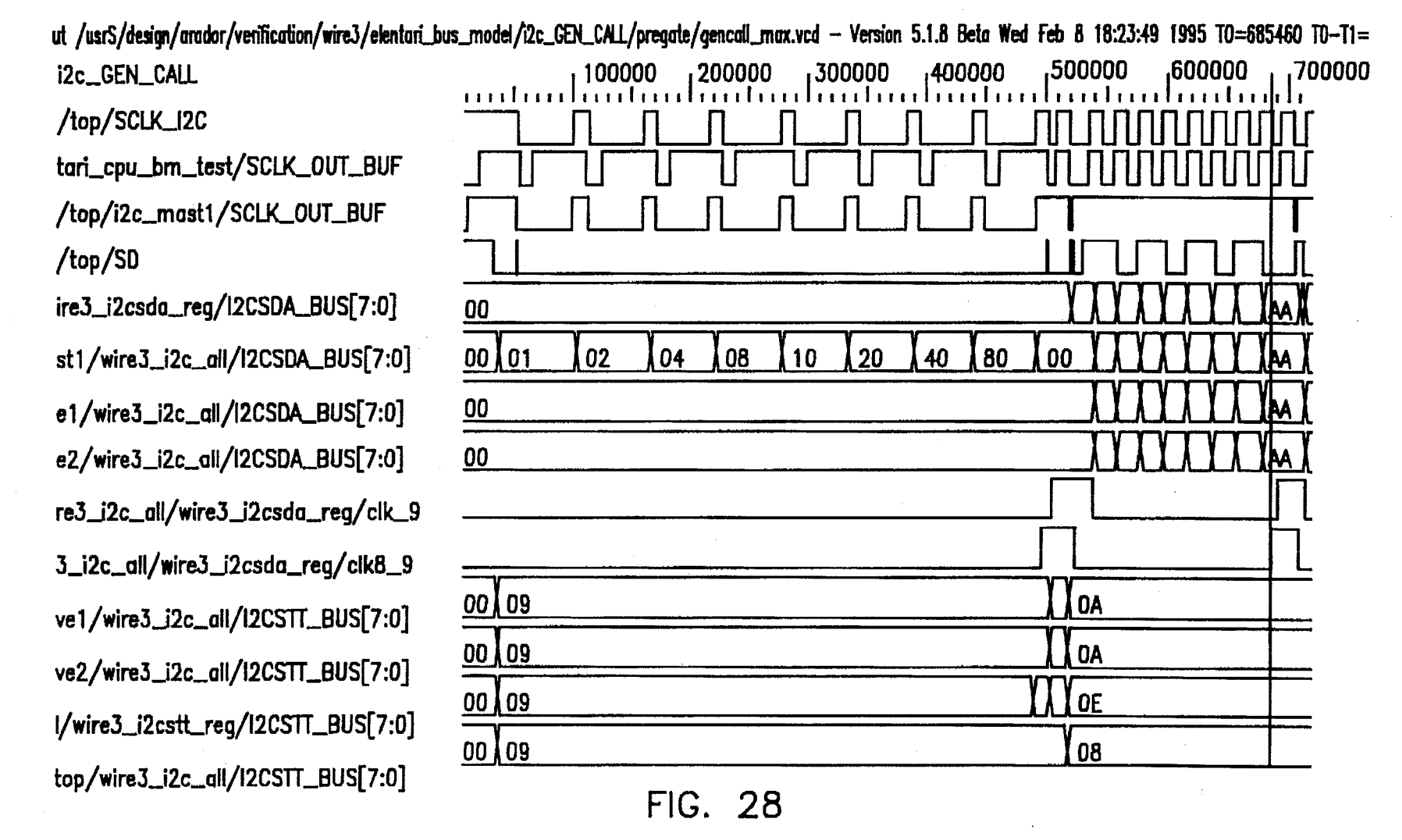

FIGS. 25–29 are timing diagrams illustrating the operation of the serial interface shown in FIGS. 1 and 2.

DETAILED DESCRIPTION OF THE PREFERRED EMBODIMENT

Figure 1:
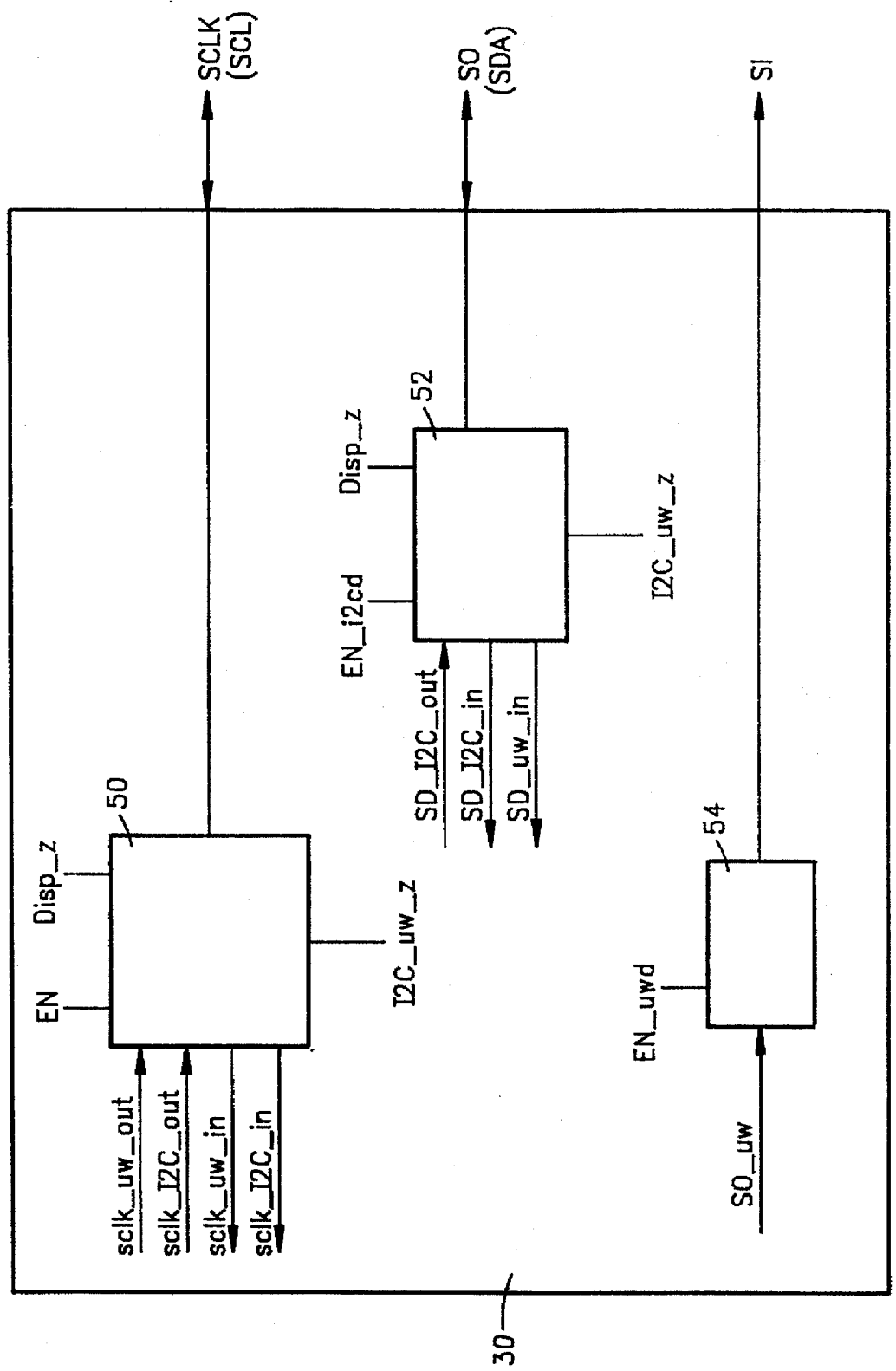
FIGS. 1–2 are block diagrams illustrating a serial interface in accordance with the present invention.
Figure 2:
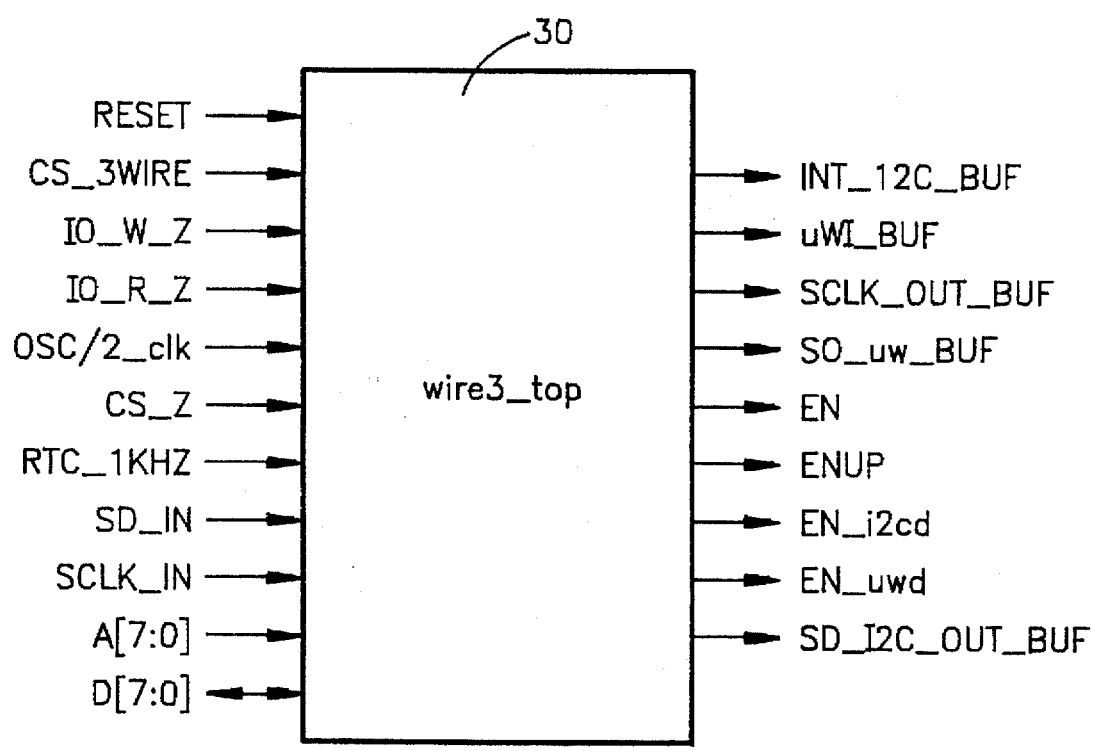

Referring to FIGS. 1 and 2 there is illustrated a serial interface 30 in accordance with the present invention. The serial interface 30 can provide for full support of either the three wire MICROWIRE™/Microwire Plus standard or the two wire System Management Bus (SMB) standard synchronous serial interfaces. As mentioned above, the SMB standard is substantially equivalent to the I²C bus standard, and the SMB standard is similar to the Access.bus standard. Specifically, according to the SMB standard, a master can be a transmitter and a receiver, and a slave can be a transmitter and a receiver. According to the Access.bus standard, a master can only be a transmitter, and a slave can only be a receiver. The following discussion assumes that the serial interface 30 operates with the three wire MICROWIRE™/ Microwire Plus standard and the two wire Access.bus standard. However, it should be well understood that the System Management Bus (SMB) standard may be substituted for the Access.bus standard, or, alternatively, the I²C bus standard may be substituted for the Access.bus standard.

Since the MicrowirePlus standard fully supports the MICROWIRE standard with the additional option to reverse on which edge the serial data is clocked out and in, it will be referred to as MICROWIRE in the rest of this document. MICROWIRE clocks data out on the falling edge of the SK clock and clocks the input data on the rising edge of SK; MicrowirePlus has the option to reverse this. MICROWIRE is fully defined in data sheets available from National Semiconductor Corporation of Santa Clara, Calif.

The term "three-wire" will refer to both the MICROWIRE or Access.bus interface, even though the Access.bus is a two line interface. The serial interface 30 uses only three pins to support both MICROWIRE™/Microwire Plus and Access.bus (or SMB or I²C standards). The pins are: SO (or SDA); SI (not used in I2C); and SCLK (or SCL). A system control register (discussed below) selects either the MICROWIRE (0–1 MHz) or Access.bus interface (0–100 KHz) and programs the three wire clock divider chain.

Figure 3:
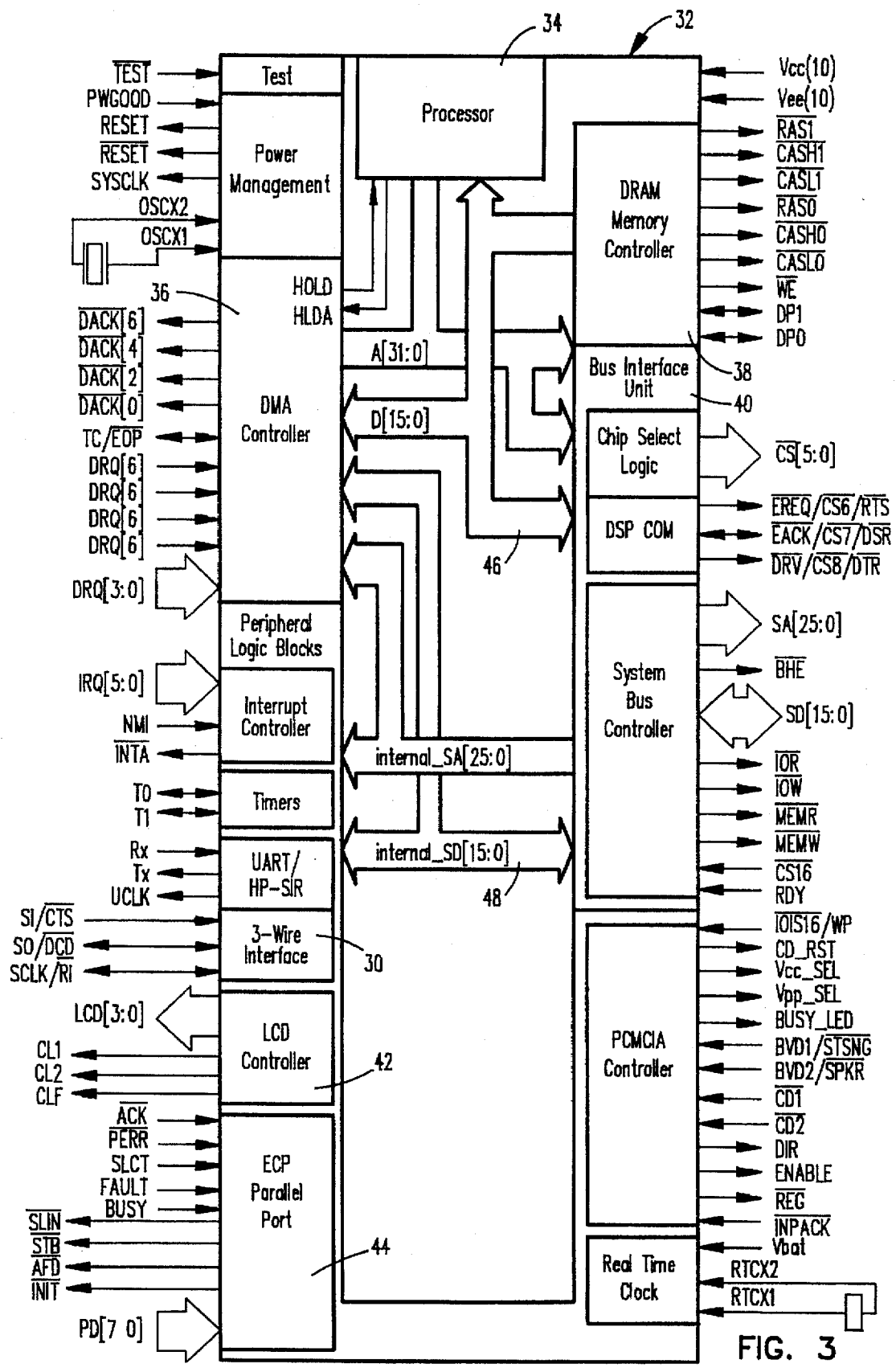
FIG. 3 is a block diagram illustrating the serial interface shown in FIG. 1 incorporated into a larger integrated circuit (IC) chip.

Referring to FIG. 3, the serial interface 30 may be incorporated into an IC chip 32 to perform serial data transfer to and from the IC chip 32. The IC chip 32 may include other internal components, such as for example, a CPU 34, a DMA controller 36, a DRAM memory controller 38, a bus interface unit 40, an LCD controller 42, and/or a parallel port 44. A CPU bus 46 and a peripheral bus 48 may be used to provide communications between all or some of the components. When the serial interface 30 is not being used, its pins may be used for some other function, such as for example, modem control lines (CTS_z, DCD_z, and RI_z).

Figure 4:
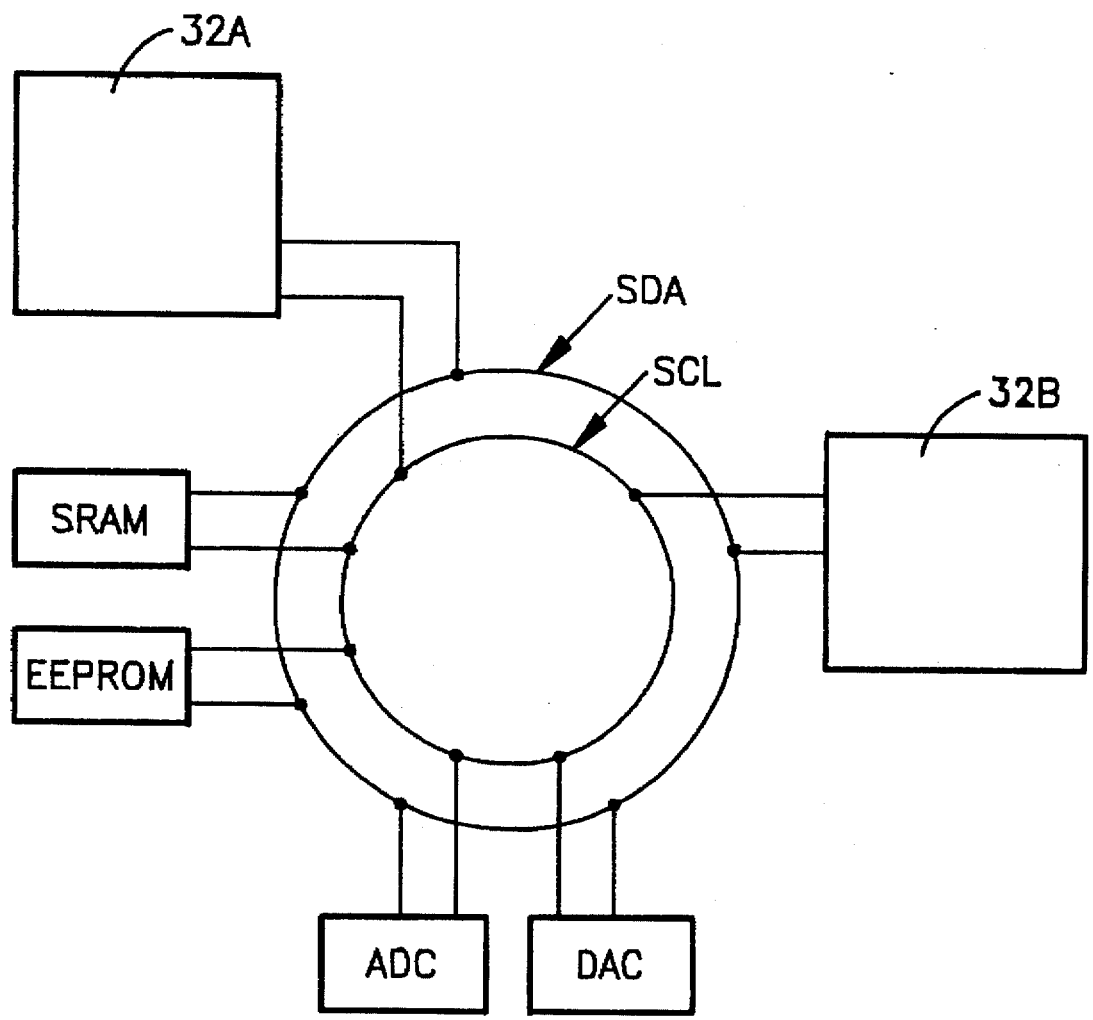
FIGS. 4–5 are block diagrams illustrating sample Access-.bus configurations.
Figure 5:
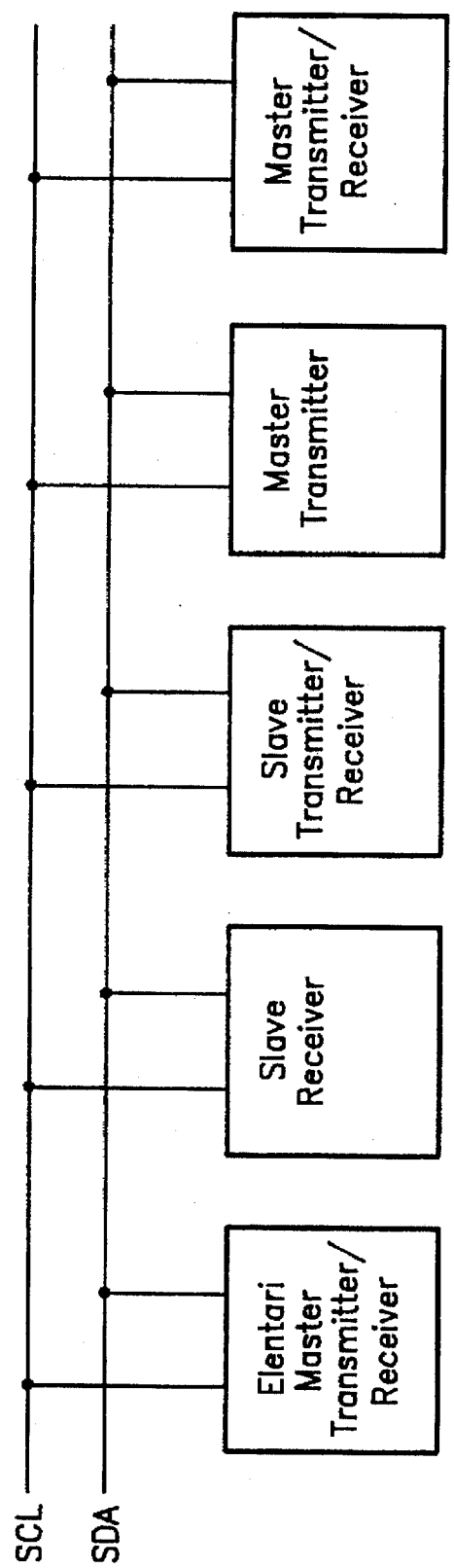

The Access.bus uses a two wire interface to allow bidirectional communications between ICs. The two interface lines are the SDA serial data line, and the SCL, serial clock line. Sample Access.bus configurations are shown in FIGS. 4 and 5. As illustrated, the Access.bus supports multiple masters, such as IC chips 32A and 32B, and many slave and master transmitters and receivers. The Access.bus protocol includes software addressing add data transfer protocols in addition to hardware definitions. The two serial lines (clock and data) may be connected to a positive supply via a pull-up resistor and may remain HIGH when the bus is not busy. Each device has a unique address and can operate as a transmitter or a receiver. Note that some peripherals will be only receivers, and most microcomputers and systems such as the IC chips 32A and 32B will be both transmitters and receivers.

During data transfers, a device can be either a master or a slave. The initiating device is considered the master, and it generates the clock signals for the transfer. Any addressed device during this transfer is considered the slave. When the IC chip 32 is initiating a data transfer with an attached Access.bus peripheral, it is the master and the transmitter. However, when the Access.bus peripheral in question responds and sends data to the IC chip 32, it is the transmitter (even though it remains the slave) and the IC chip 32 is the receiver (even though it remains the master. In other words, the Master can be both a transmitter and a receiver, and a Slave can be both a transmitter and a receiver. The key is that the initiator and provider of the clock signal is the Master.

As shown in FIGS. 4 and 5, it is possible to have more than one master on the bus. Because of this, an arbitration has been included in the Access.bus implementation. It depends on a wired-AND connection to the devices on the bus and clock synchronization. In most cases, however, the IC chip 32 will be the sole Master.

Referring again to FIG. 1, the serial interface 30 includes a bidirectional clock transfer circuit 50, a bidirectional data transfer circuit 52, and an output data transfer circuit 54. The bidirectional clock transfer circuit 50 is used for the input and output of the clock signals for both MICROWIRE and I²C. The bidirectional data transfer circuit 52 is used for the data input and output for I²C, and only the data input for MICROWIRE. The output data transfer circuit 54 is used for the data output for MICROWIRE.

Figure 6:
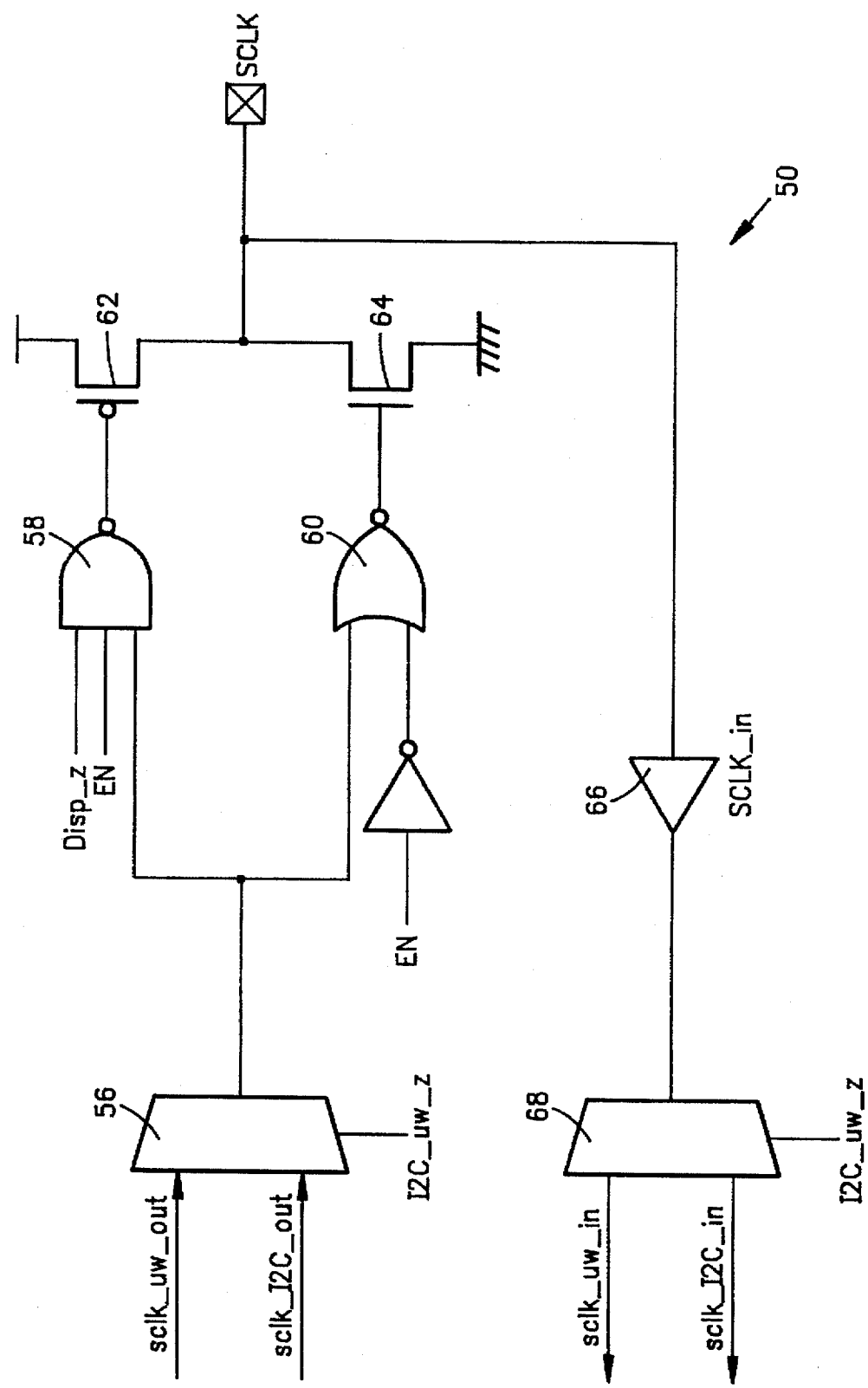
FIGS. 6–8 are schematic diagrams illustrating the serial interface shown in FIGS. 1 and 2.

Referring to FIG. 6, the bidirectional clock transfer circuit 50 is connected substantially as shown. In order to select MICROWIRE, the enable signal EN is set to a "1" and the select input I2C_uw_z is set to "0". These inputs are controlled by software and are set via a control register (discussed below). The Disp_z signal is equal to the NAND of the enable signal EN and select input I2C_uw_z, which in this case is a "1". The MICROWIRE output clock sclk_uw_out is received by a buffer 56. Both the NAND gate 58 and the NOR gate 60 are enabled which means that both the p-channel transistor 62 and the n-channel transistor 64 will be driven in totem pole by the clock sclk_uw_out.

Driving the output transistors 62 and 64 in a totem pole fashion is a specified in the MICROWIRE standard. Thus, the output clock sclk_uw_out is sent out on pin SCLK. An input MICROWIRE clock sclk_uw_in is received at pin SCLK and is transferred through the buffers 66 and 68.

In order to select I²C, the enable signal EN is set to a "1" and the select input I2C_uw_z is set to "1". The Disp_z signal is equal to the NAND of EN and I2C_uw_z, which in this case is a "0". The I²C output clock sclk_I2C_out is received by the buffer 56. The Disp_z signal disables the NAND gate 58 which in turn disables the p-channel transistor 62. Thus, the output forms an open drain with only the transistor 64 driving the output clock sclk_I2C_out through pin SCLK. An input I²C clock sclk_I2C_in is received at pin SCLK and is transferred through the buffers 66 and 68.

Figure 7:
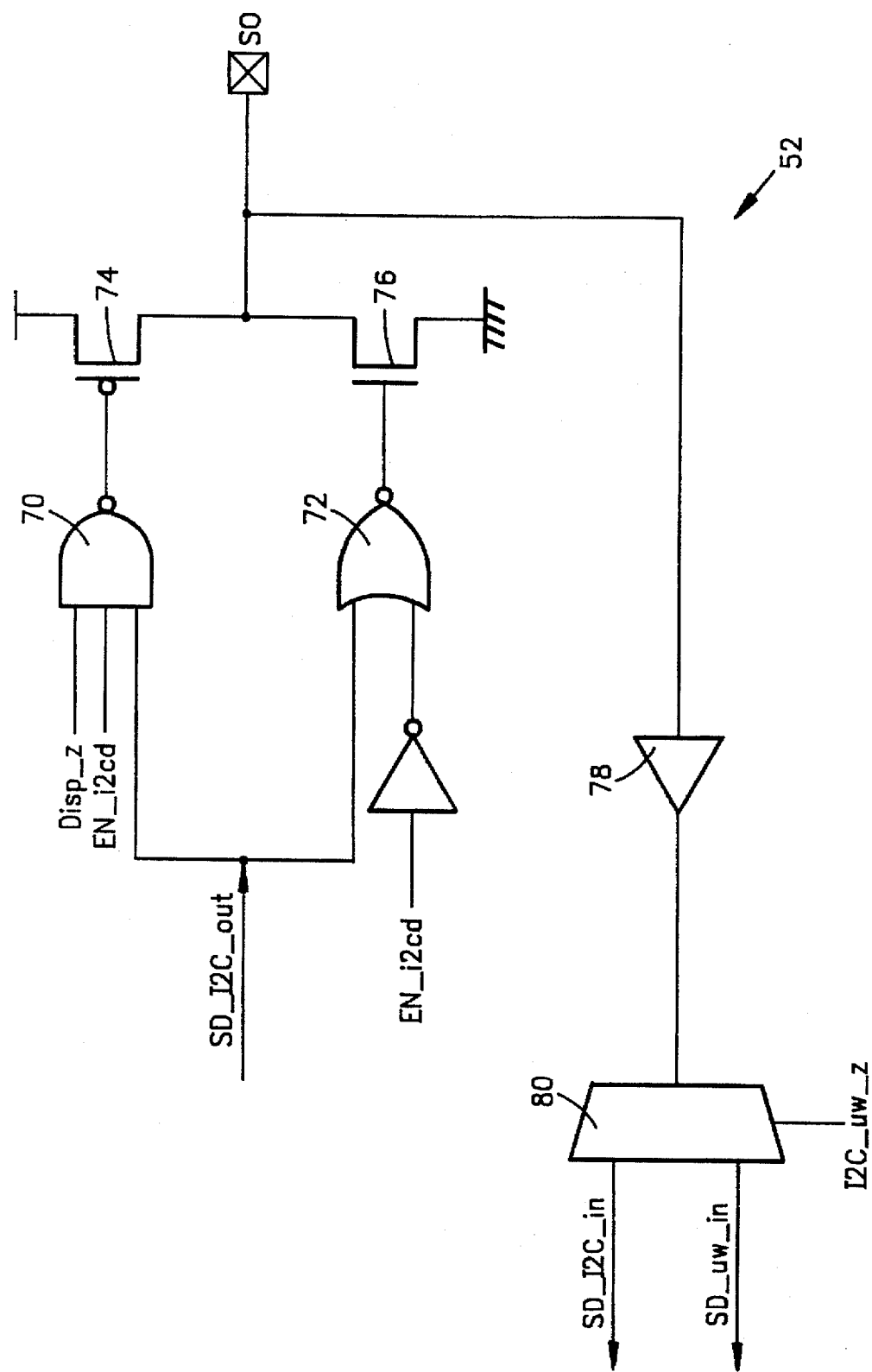

Referring to FIG. 7, the bidirectional data transfer circuit 52 is connected substantially as shown. Again, in order to select I²C, the enable signal EN is set to a "1" and the select input I2C_uw_z is set to "1". The Disp_z signal is equal to the NAND of EN and I2C_uw_z, which in this case is a "0". Furthermore, an I²C data out enable signal EN_i2cd is equal to the AND of the enable signal EN and the select input I2C_uw_z, which in this case is a "1". The I²C output data signal SD_I2C_out is received by the NAND gate 70 and the NOR gate 72. However, the NAND gate 70 is disabled because the Disp_z signal is equal to "0". Thus, the p-channel transistor 74 is also disabled, and similar to above, the output forms an open drain with only the transistor 76 driving the output data SD_I2C_out through pin SO. An input I²C data signal SD_I2C_, in is received at pin SO and is transferred through the buffers 78 and 80.

In order to select MICROWIRE, the enable signal EN is set to a "1" and the select input I2C_uw_z is set to "0". The Disp_z signal is equal to the NAND of EN and I2C_uw_z, which in this case is a "1", and the enable signal EN_i2cd is equal to the AND of EN and I2C_uw_z, which in this case is a "0". An input MICROWIRE data signal SD_uw_in is received at pin SO and is transferred through the buffers 78 and 80. The bidirectional data transfer circuit 52 is used only for the MICROWIRE data input and not the MICROWIRE data output.

Figure 8:
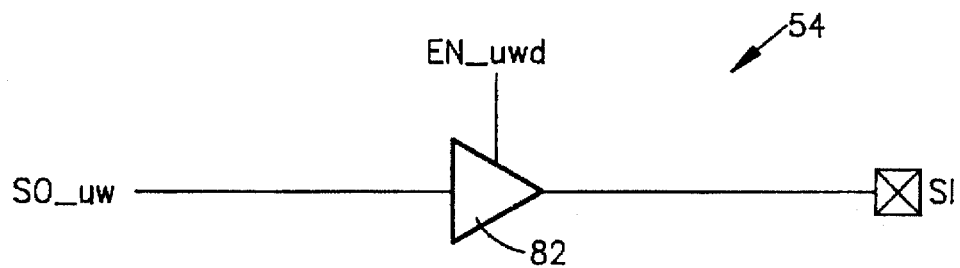

Referring to FIG. 8, the output data transfer circuit 54 is connected substantially as shown. Again, in order to select MICROWIRE, the enable signal EN is set to a "1" and the select input I2C_uw_z is set to "0". A MICROWIRE data out enable signal EN_uwd is equal to the AND if the enable signal EN and the complement (i.e., negation) of the select input I2C_uw_z signal, which in this case the result of the AND is a "1". The MICROWIRE data output signal SO_uw is transferred through a buffer 82 to the output pin SI.

In order to disable both MICROWIRE and I²C for all of the circuits 50, 52, and 54, the enable EN signal is set to a "0" and the pins SCLK, SO, and SI are all tri-stated, i.e., set the a high impedance state. Thus, two software controlled bits, i.e., the enable signal EN and the select input I2C_uw_z, and only three input/output pins, i.e., SCLK, SO, and SI, can be used to select either MICROWIRE or I²C. Two of the input/output pins, i.e., SCLK and SO, will automatically be configured to open drain for I²C or totem pole for MICROWIRE. A programmable clock divide down tree supplies adequate clock frequency for them.

Figure 9:
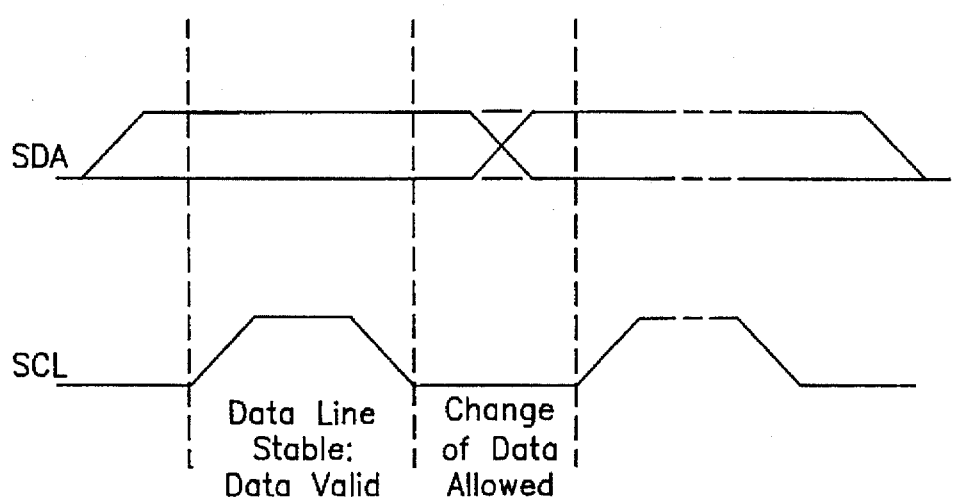
FIGS. 9–13 are timing diagrams illustrating Access.bus data transfers.

During Access.bus data transfers, data is transferred during the high state of the serial clock (SCL). Data must change during the low state of the clock. During the high state, the data is read, and assuming the data is stable throughout the high period of the clock, the data is assumed to be valid. This is shown in FIG. 9.

One data bit is transferred during each clock pulse. The data on the SDA line must remain stable during the HIGH period to be valid. This is because, data transitions during the high period of the SCL are interpreted as control signals. This permits a single data line to transfer both command/control information and data using the synchronous serial clock.

Figure 10:
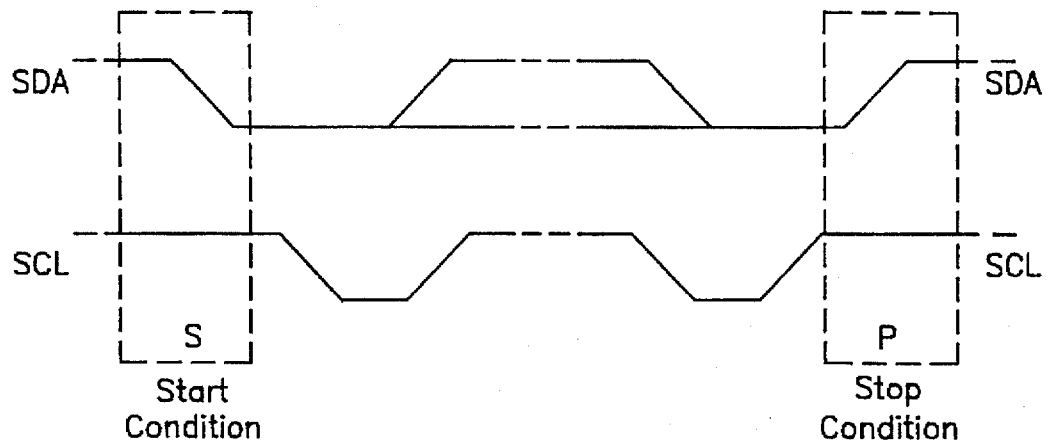

A high-to-low transition of the data line (SDA) while the clock (SCL) is high, indicates a START condition as shown in FIG. 10. Likewise, a low-to-high transition of the SDA line while the SCL is high indicates a STOP condition.

The bus is considered to be busy after the START condition and free again after a certain time interval after the STOP condition. START and STOP conditions are generated by the Master.

Figure 11:
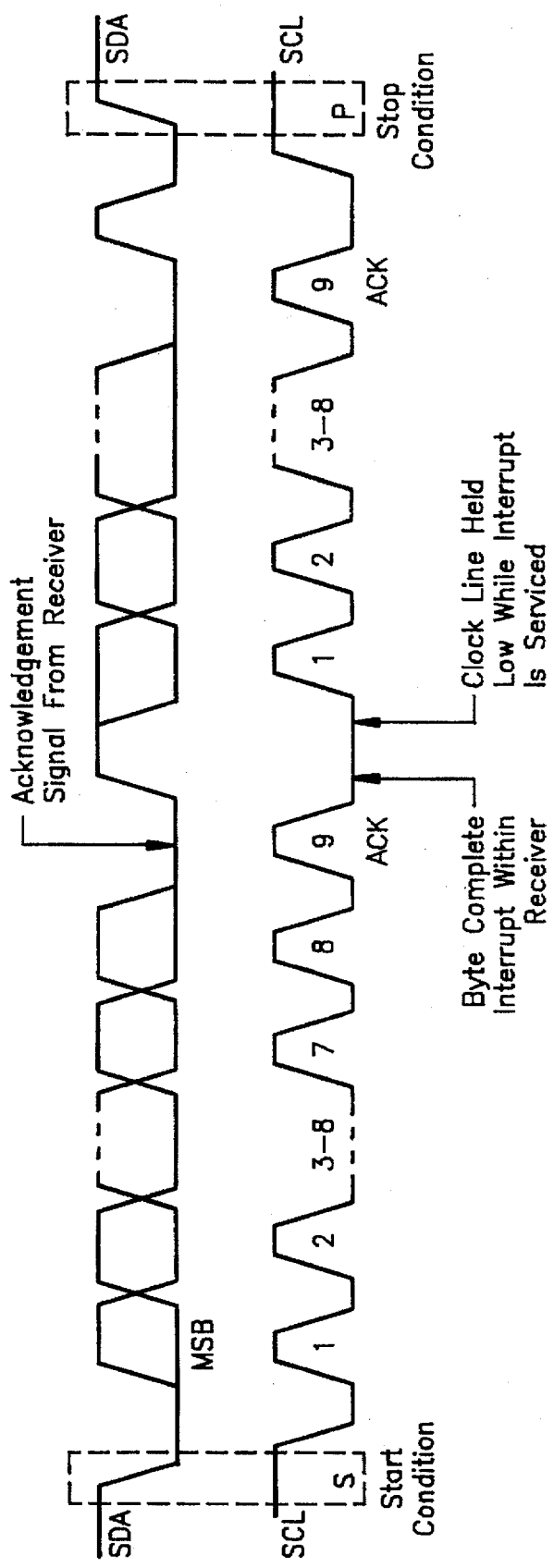
Figure 12:
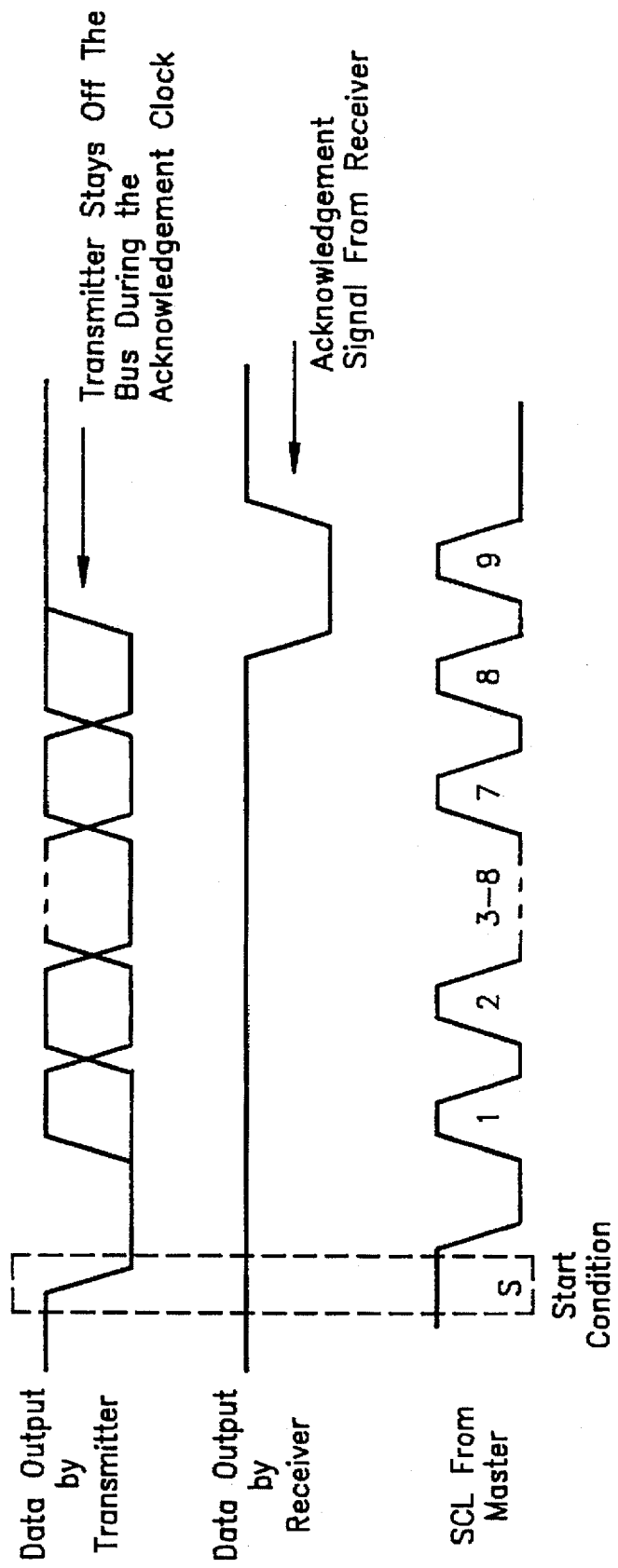

During a data transfer, the smallest unit of transfer is the byte. Any number of data bytes can be transferred at a time. Each byte is transferred with the most significant bit first, and after each byte (8 bits) an Acknowledge bit must follow as shown in FIG. 11. The Master must generate the Acknowledge bit clock pulse and the receiver must pull down the SDA line during the acknowledge clock pulse, while the transmitter releases the SDA line (letting it go high) during the acknowledge pulse. FIG. 12 shows this condition.

A slave receiver must generate an acknowledge after the reception of each byte, and a master must generate one after the reception of each byte clocked out of the slave transmitter. If the receiving device cannot receive the data immediately, it can force the transmitter into a wait state by holding the clock line (SCL) low. This can happen when the receiver is busy with some peripheral related task or is otherwise occupied with higher order system tasks. When this happens, the master, after a time-out, should abort the transfer by generating a stop condition, allowing others transfers to take place.

There are two exceptions to the "acknowledge after every byte" rule. The first is when the master is the receiver. It must signal an end of data to the transmitter by NOT signalling an acknowledge on the last byte that has been clocked out of the slave. This "negative acknowledge" still includes the acknowledge clock pulse, (generated by the master), but the SDA line is not pulled down. The second exception is when a slave will send a negative acknowledge when it can no longer accept additional data bytes. This happens when the receiver is full, otherwise occupied or a problem has occurred. In these conditions, the slave also generates a "negative acknowledge."

With respect to addressing transfer formats, each device on the bus has a unique address. Before any data is transmitted, the master transmits the address of the slave being addressed. The slave device, once it recognizes its address, should acknowledge that the address matches with an acknowledge on the SDA line.

Figure 13:
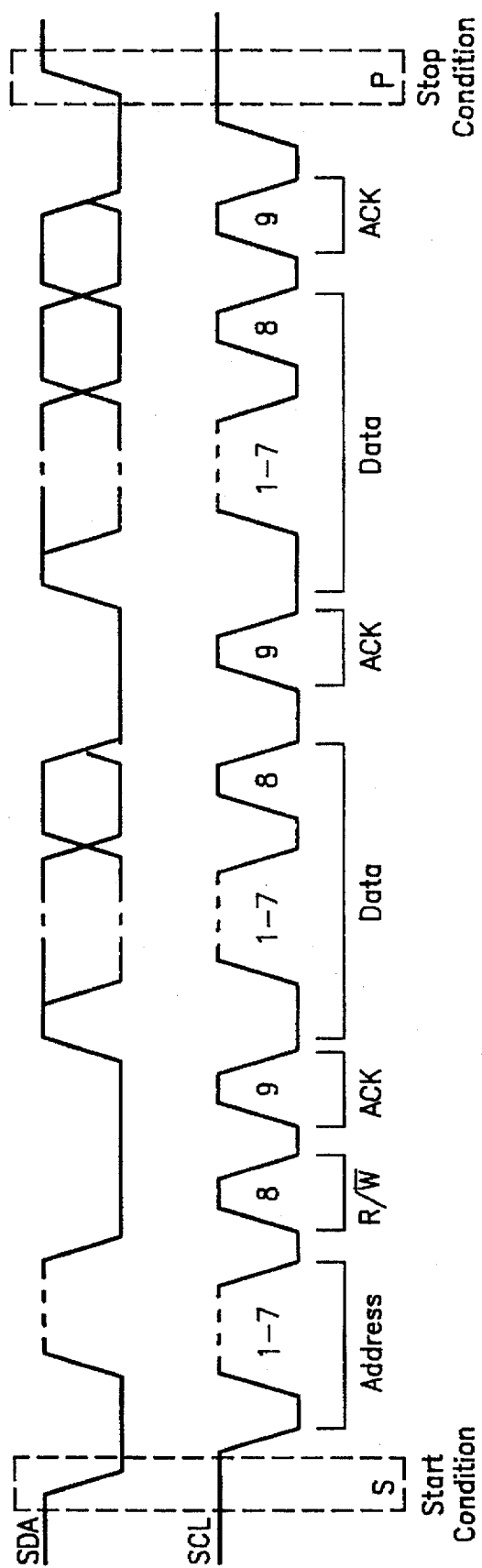

The address is the first seven bits after a START condition. The 8th bit is the direction (R/W) indicator. A complete data transfer is shown in FIG. 13 and shows the start condition, followed by a 7 bit address, a 1 bit R/W indicator, a 1 bit Acknowledge, followed by a second data byte, a 1 bit Acknowledge and so on. A low-to-high transition during a SCL high period indicated the STOP condition and ends the transfer.

When the address is sent, each device in the system compares its address with the sent address. If there is a match, the device will consider itself addressed, and will send an acknowledge. Depending upon the state of the R/(W__z) bit (1=read, 0=write), the device will act as a transmitter (send data) or a receiver (receive data).

As mentioned above, the serial interface 30 includes a three-wire control register (3WCON). The MICROWIRE (supporting a 0–1 MHz serial clock frequency) and Access-.bus interfaces (supporting a 0–10 KHz serial clock frequency) utilize specific clock frequencies and this register is used to control those frequencies. Specifically, the bit assignments of the control register 3WCON is as follows. Bits 7–6: SL1,2 which combine with SL0 to selected CPU clock divided by 4, 8, 16, or 32. Bits 6–3: Con2–0 which set the 8-bit counter initial value. SL0 and SL1 are two select signals to select divide-by 4, 8, 16, or 32 CPU clock, as shown in Table A. This prescaled clock goes to an 8-bit counter controlled by Con0, Con1 and Con2, as shown in Table B. With these five select bits, one can chose the CPU clock divided by 8, 16, 24, 32, 40, 48, 56, 64, 80, 96, 112, 128, 160, 192, 224, 256, 320, 384, 448 and 512 as the clock source for the three-wire interface logic.

TABLE A

| SL1 | SL0 | CPU Clock divided by |
|---|---|---|
| 0 | 0 | 4 |
| 0 | 1 | 8 |
| 1 | 0 | 16 |
| 1 | 1 | 32 |

Con0, Con1, Con2, SL1, and SL0 should be programmed according to the frequency of the CPU used in the hardware. They determine frequency of the clock used in this block, and are used to optimize performance at different oscillator speeds.

TABLE B

| Con2 | Con1 | Con0 | CPU Clock divided by |
|---|---|---|---|
| 0 | 0 | 0 | 2 |
| 0 | 0 | 1 | 4 |
| 0 | 1 | 0 | 6 |
| 0 | 1 | 1 | 8 |
| 1 | 0 | 0 | 10 |
| 1 | 0 | 1 | 12 |
| 1 | 1 | 0 | 14 |
| 1 | 1 | 1 | 16 |

Bit 2 is the enable signal EN discussed above. This bit enables 3-wire interface when it is a "1", and disables 3-wire interface when it is a "0". This is the Global Enable bit. Bit 1 is the select input I2C__uw__z bit discussed above, also referred to herein as the A__UW bit. When this bit is a "0" MICROWIRE is selected, and when this bit is a "1", Access.bus (I²C) is selected. Bit 0 is a soft reset bit S__RESET. Based on any bus error condition, software can issue a software reset to this block by setting this bit to="1".

The three-wire control register module has following functions. It decodes IO read/write, CS__3wire, and the address bus to generate all read/write strobes for 3-wire. It handles register reads. All modules containing readable registers will send the bus to this module. They will be mixed and sent out in the read cycle. The three-wire control register writes to the scon[7:0] register. It performs a watch dog function. When I2C is selected, if the clock holds low more than 2 ms (Access.bus required), an overflow and interrupt to the CPU will be generated. RTC_1 KHZ clock is used to implement this function. The clock divided down chain is performed by this module. OSC/2_clk is divided by 4, 8, 16 and 32. This prescaled clock go to count will increment after every rising edge until it is equal to [Con2, Con 1,Con0]. This is a continuous running clock when 3-wire is enabled. It will go to Microwire or I2C depending on which is selected. Finally, the three-wire control register module selects incoming data/clock being I2C data/clock or Microwire data/clock depend on which is selected.

The serial interface 30 includes MICROWIRE registers. MICROWIRE and Microwire/Plus are synchronous serial three-wire interface communication systems that allow chips, such as the IC chip 32, to communicate with any other device that also supports the MICROWIRE and Microwire/Plus interface. There are two 8-bit MICROWIRE registers.

A serial input/output register (SIO) is an 8-bit shift register, called the SIO (Serial Input/Output and PIPO) register. It is used for both transmitting and receiving data. In MICROWIRE systems, the most significant bit is transmitted (received) first and the least significant bit is transmitted (received) last. The CPU 34 reads and writes to the SIO register via an 8-bit parallel data bus. It is a read/write register ad has an I/O map address of 0051h.

The Microwire module has following functions. It synchronizes UW_BUSY and uses this UW_BUSY_sync to gate with a divided down but continues running the clock to get the Microwire clock (8 clock pulses as one group) when in master mode. One clock count is sued for counting 8 clocks. When 8 clocks is reached, UW_BUSY_will be cleared, and uWI will set and count reset. SIO shift/load register implementation is written to when in the programming cycle, and shifting when in the Microwire transfer phase. SK normal mode and alternate mode are implemented by input and output latch. In SK normal mode, the output latch is transparent (LATZ=1'b1). The input latch is a delayed, reversed CLK. The clock will gate with SLAVE_EN. When in master mode SLAVE_EN=1, and when in slave mode, if CS_Z active low, then SLAVE_WN=1.

The other MICROWIRE register is a MICROWIRE Control Register (uWCOND). The bit assignments are as follows. Bits 7-4 are reserved. Bit 3 is a busy transmitting flag BUSY. When set, it indicates that the shift register is in shifting phase. Bit 2 is an SK clock mode bit SCTL. When this bit is a zero, resulting in standard SK mode, the output data on SO is clock out on the falling edge of the SK clock and the input data on SI is sampled on the rising edge of the SK clock. When this bit is a one, resulting alternate SK mode, the SK clock edge functions are reversed. Bit 1 is a configuration bit CONFIG. When this bit is a "1" the Microwire/Plus interface will operate in Master mode. When this bit is a "0" the Microwire/Plus interface operates in slave mode. Bit 0 is a MICROWIRE transmit/receive interrupt flag uWI. Set at the end of SIO register shifting.

With respect to the Access.bus serial interface, two wires, serial data and serial clock, carry information between the devices connected to the Access.bus. Each device is recognized by a unique address and can operate as either a transmitter or receiver, depending on the function of the device. It is a multi-master bus. Four modes are supported: 1) Master Transmit (MT); 2) Master Receive (MR); 3) Slave Transmit (ST); and 4) Slave Receive (SR). There are 4 registers inside the Access.bus module: 1) Serial Input/Output Data Register (SDA); 2) Access.bus Status Register; 3) Access.bus Control Register; and 4) Own Address Register.

The Serial Input/Output DATA Register (SDA) is an 8-bit shift register used for both transmitting and receiving data. The most significant bit is transmitted (received) first and the least significant bit is transmitted (received) last. The CPU 34 reads and writes SIO via an 8-bit parallel data bus. It is a read/write register and has an I/O map address of 0053h.

The Access.bus Status Register is a read only register and has a reset condition of 000000; all bits are set by hardware. The bit assignments are as follows. Bits 7,6 are reserved. Bit 5 is an error flag Stop_ERR. It will be set by hardware when during data transfer, Stop-condition has been detected (Stop =1 when Busy=1). Software needs to issue soft reset to clear this error, and all Access.bus devices need to be checked. Bit 4 is an error flag No_ACK. When in Master mode, a transmission is not acknowledged on the 9th clock. In Master mode, when this bit becomes one, it will generate a Stop; in Slave mode, when this bit becomes one, the device will go to idle. Bit 3 is a bus busy flag BB. If set, it indicates that the Access.bus is currently busy. It is set by Start condition and cleared by Stop or Reset condition. Bit 2 is an Arbitration Loss flag ARL. When set, it indicates that this device lost arbitration while trying to take control of bus. It is cleared by Reset, Stop, and by software. Bit 1 is an Address match flag MATCH. In slave receive mode, this bit is set to one when the address byte (the first byte transferred) matches the 7-bit address in the Own Address Register. It is cleared by Reset, Start, Stop, and software conditions. Bit 0 is a start flag START. It will be set by hardware when a START condition is detected. It is cleared at the end of the first byte transferred and by Reset and Stop.

Besides the above status bits, the Access.bus status register also generates some other signals which are used in other modules. First, when a STOP condition detected, a STOP flag will be set. It is cleared by RESET and the next START condition. A XMIT bit indicates on the first byte whether the next cycle type is a read or write. In MT mode, data=0 means the next cycle is a write type, and data=1 means the next cycle is a read type. In slave receive mode, it will interpret the opposite.

The Access.bus Control Register is a write/read register having a reset condition of 00000000 and an I/O map address of 0055h. The bit assignments are as follows. Bits 7, 6 are reserved. Bit 5 is an overflow flag OVERFLOW. This bit will be set to one when the serial clock (SCLK) is held low for more than 1024 transfer clock periods. In Master mode, when this bit is set, the transfer should be aborted and the Access.bus should be reset. Bit 4, MASTRQ, is set to request control of the bus as a master by software. Bit 3 is Access.bus interrupt flag ABINT. It will be set to a "1" at the end of a transfer by hardware. It must be cleared by software. Bit 2 is a stop signal STOP_W. In master mode, setting this bit causes STOP action and generates a stop pulse. Bit 1 is a Busy Transmitting flag BUSY. A "0"=ready, and a "1"=busy, or not ready. It is set by software when SDA register is shifting. If it is set to "0", it pulls down the SCL line. After transmitting 8 data bits and a 9th Acknowledge bit, hardware will clear this bit. Bit 0 is an Acknowledge flag ACK. This bit is set by hardware at the 9th clock (if no bus error) after a received acknowledge from receiver. It is set by the value of the receiver acknowledge. It should be cleared by user software before the next transfer begins. In Master Transmit mode, if ACK=0, this bit will cause a master abort (generate STOP condition). In Slave Transmit mode, if ACK=0, it will stop the transfer and go back into the idle state. In Master and Slave Receive modes, user software controls this bit. It should be set to "1" normally causing the Access.bus controller to send an acknowledge automatically after every byte. The bit should be reset when in Master Receive mode and it will require that no further data to be sent from the slave transmitter. This causes a "negative acknowledge" on the Access.bus halting any further transmission from the slave. A Reset or Stop condition resets bit to zero.

The control and status bits in the Access.bus Control Register are set by user software and all bits are cleared by software and by RESET. A second function of the Access.bus control register module is to generate the I²C serial clock. All clocks in the I²C bus are connected by open drain.

Figure 14:
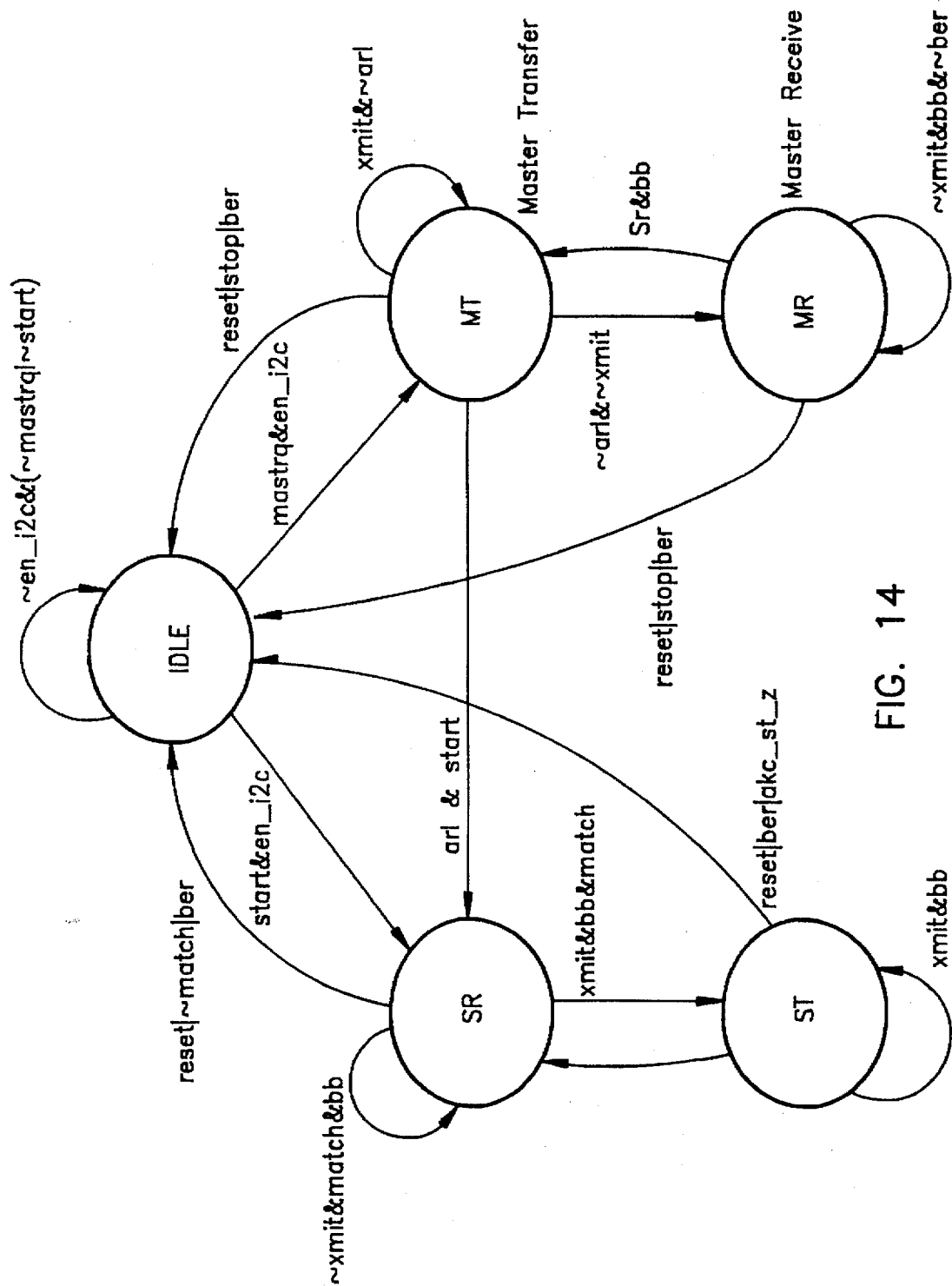
FIGS. 14–15 are state diagrams illustrating the operation of the serial interface shown in FIGS. 1 and 2.

Referring to FIG. 14, the mode (clock) state machine entails five states. Specifically, the first state is an idle state T_IDLE (00001). This is the default/RESET state. If the serial interface 30 is globally disabled, or I2C is not selected, or I2C is enabled but no START condition is detected, or no master request bit has been sent, it will stay in this state. The second state is a master transmit state T_MT (00010). If MASTRQ bits are set, the IC chip 32 will try to be the bus master. The state machine will switch from T_IDLE to this state. A start condition will be generated, and the clock will start send out. But if arbitration is lost at the first byte (address calling), it will switch to slave receive mode, since the winning master may call arador_i2c. If arbitration is lost at the following byte (not first byte), it will go to the T_IDLE state. This occurs when the IC chip 32 and another chip win master addressed some slave but set out different data. If the next transfer is a READ (this info is contained in the first byte 8th data), then it should go to T_MR (master receive mode). If none of above three condition occurs, then the IC chip 32 wins the arbitration and the next cycle is a write, and it stays in T_MT state.

The third state is a master receive mode T_MR (00100). If MASTRQ is high (repeat start condition: Sr), then the state goes to T_MT; otherwise, it will stay in T_MR. The fourth state is the slave receive mode T_SR (01000). If I2C is enabled and a START condition is detected, but the IC chip 32 did not request MASTRQ, the state machine will switch from T_IDLE to T_SR. If the address does not match own_address (after receive 7 bits address and compare to own_address register), or an error condition happens, it will go to T_IDLE, since the slave not responsible for generating a "STOP" condition. If the address is matched but the next cycle is a "master read/slave write", it will change to slave transmit mode. If the address is matched, and the next cycle is "master write/slave read", it will stay in T_SR. The fifth state is the slave transmit mode T_ST (10000). If the address is matched and the next cycle is a slave write, the state machine switches from T_SR to T_ST. If an error occurs (no acknowledge at 9th clock or premature STOP), it will go to T_IDLE.

Figure 15:
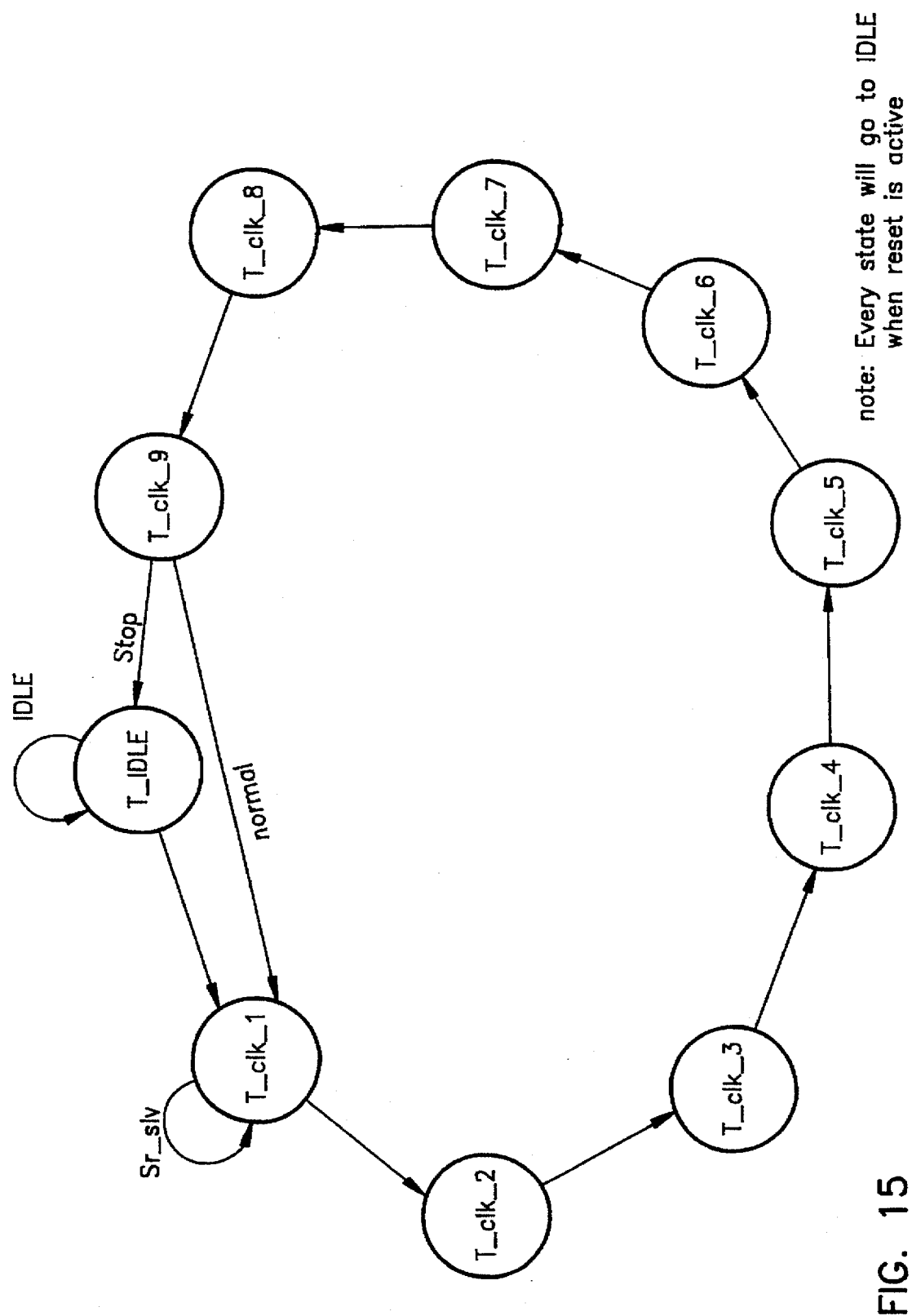
Figure 16:
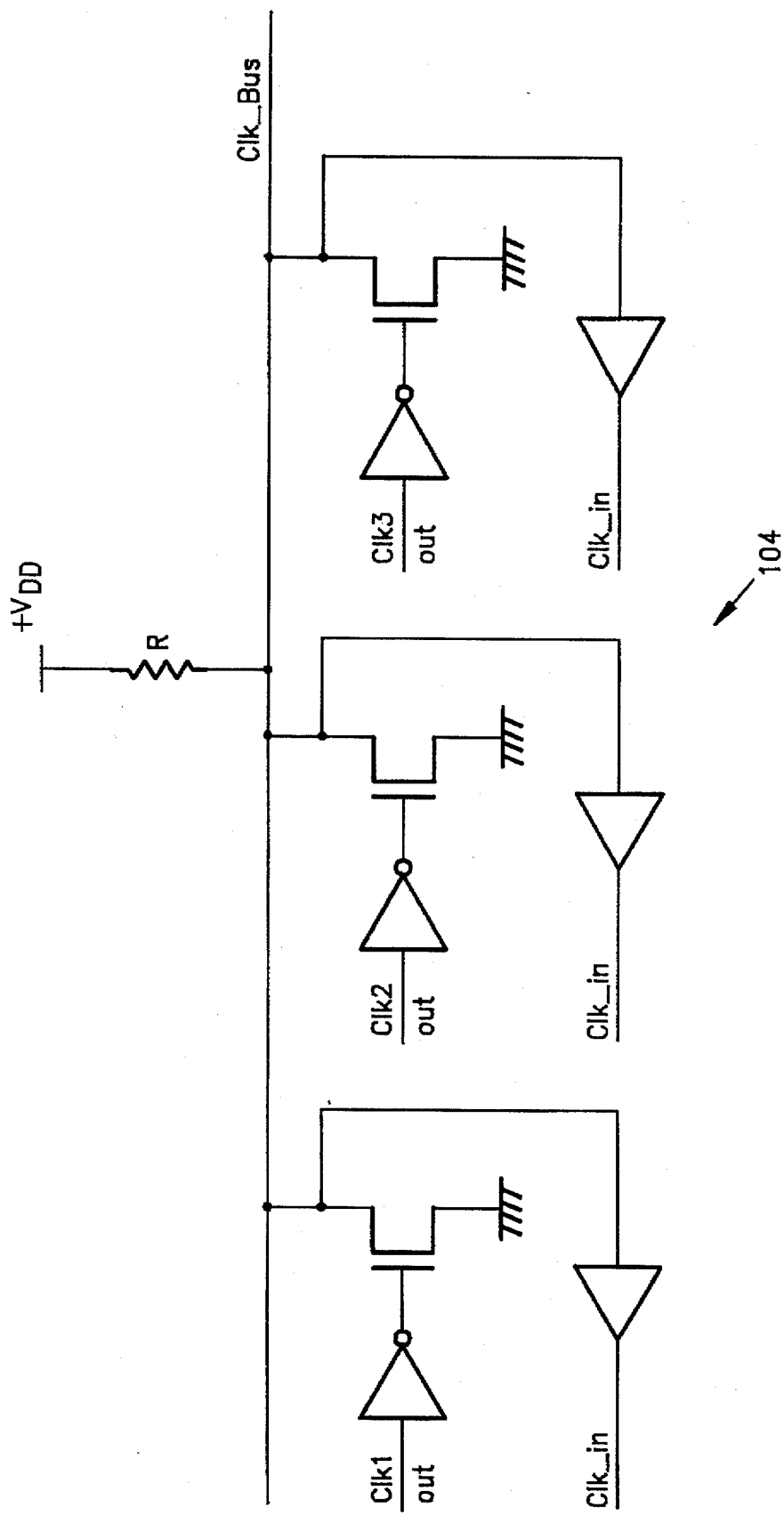
FIG. 16 is a schematic diagram illustrating clock generation circuit which may be used in the serial interface shown in FIGS. 1 and 2.
Figure 17:
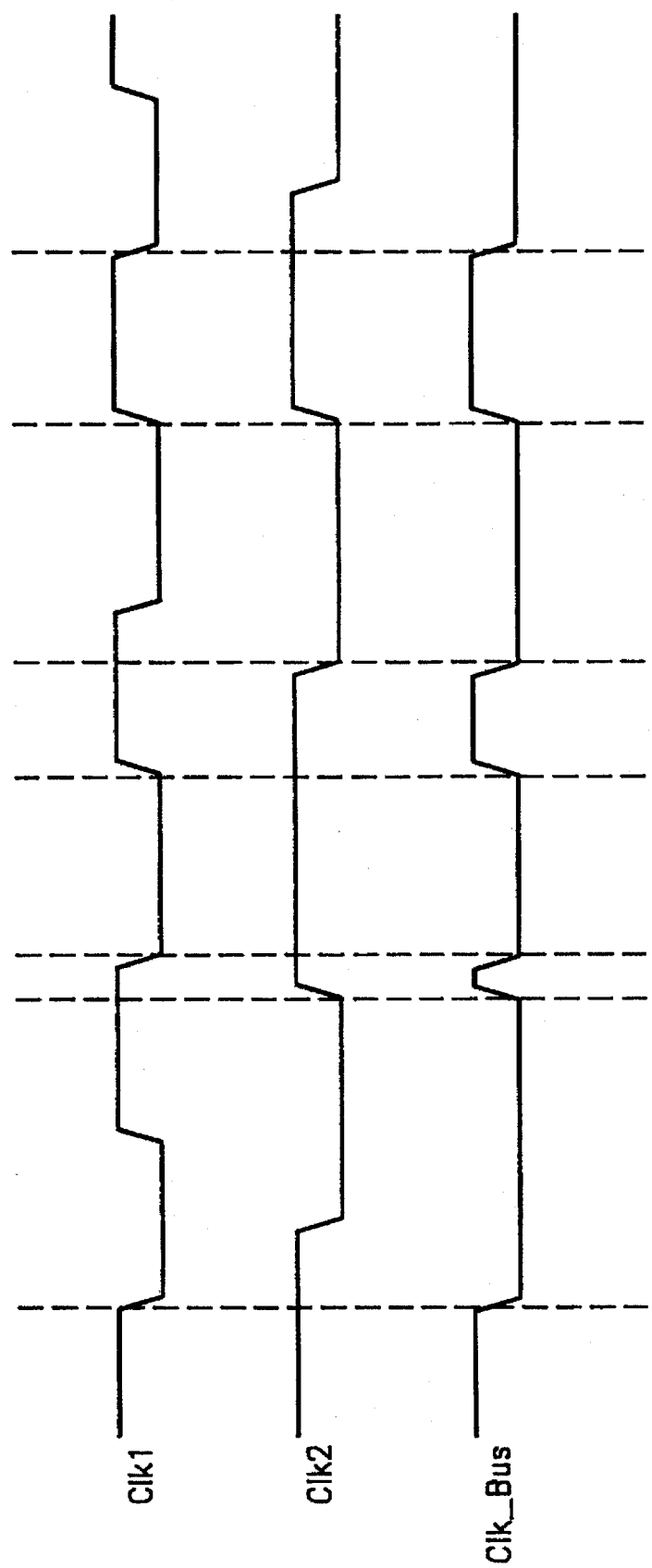
FIGS. 17–18 are timing, diagrams illustrating the operation of the clock generation circuit shown in FIG. 16.
Figure 18:
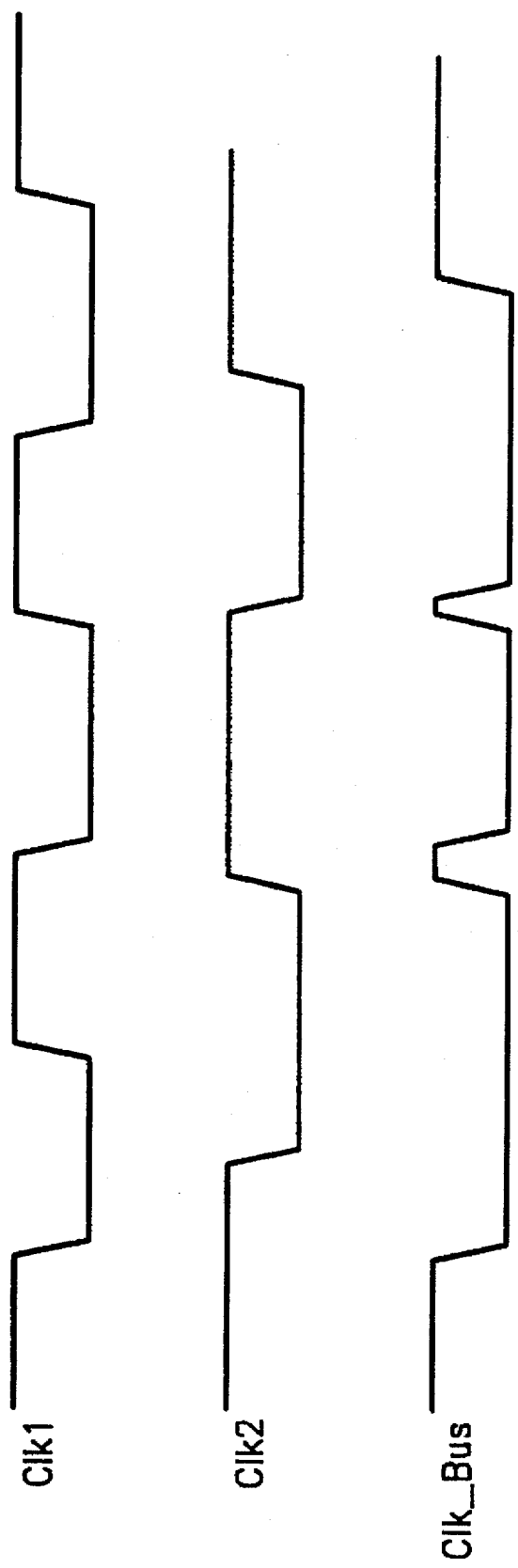

Referring to FIG. 15, the "Clock State" state machine has ten states. This state machine includes 9 clock counts and gives correct clock state reference. Referring to FIG. 16, if the clocks are generated by a divide down structure clock generation circuit 104, all clocks in the open drain bus will have different frequencies and asynchronicities. Referring to FIGS. 17–18, if all clocks are generated by a divide down from the system clock, they will run asynchronously and with different frequencies. The open drain bus functions as a wired-and. The clk_Bus may not be able to guarantee minimum high pulse width (each of them may guarantee that). The resulting CLK_BUS functions as a wire_AND and could result in very small high pulses and violate the minimum high pulse specification even though all the clocks themselves do not violate the high pulse specification. In I²C clock bus, the slave can stretch the clock low for a transfer handshake, and the slave can release the clock asynchronously and the glitch clock also.

Figure 19:
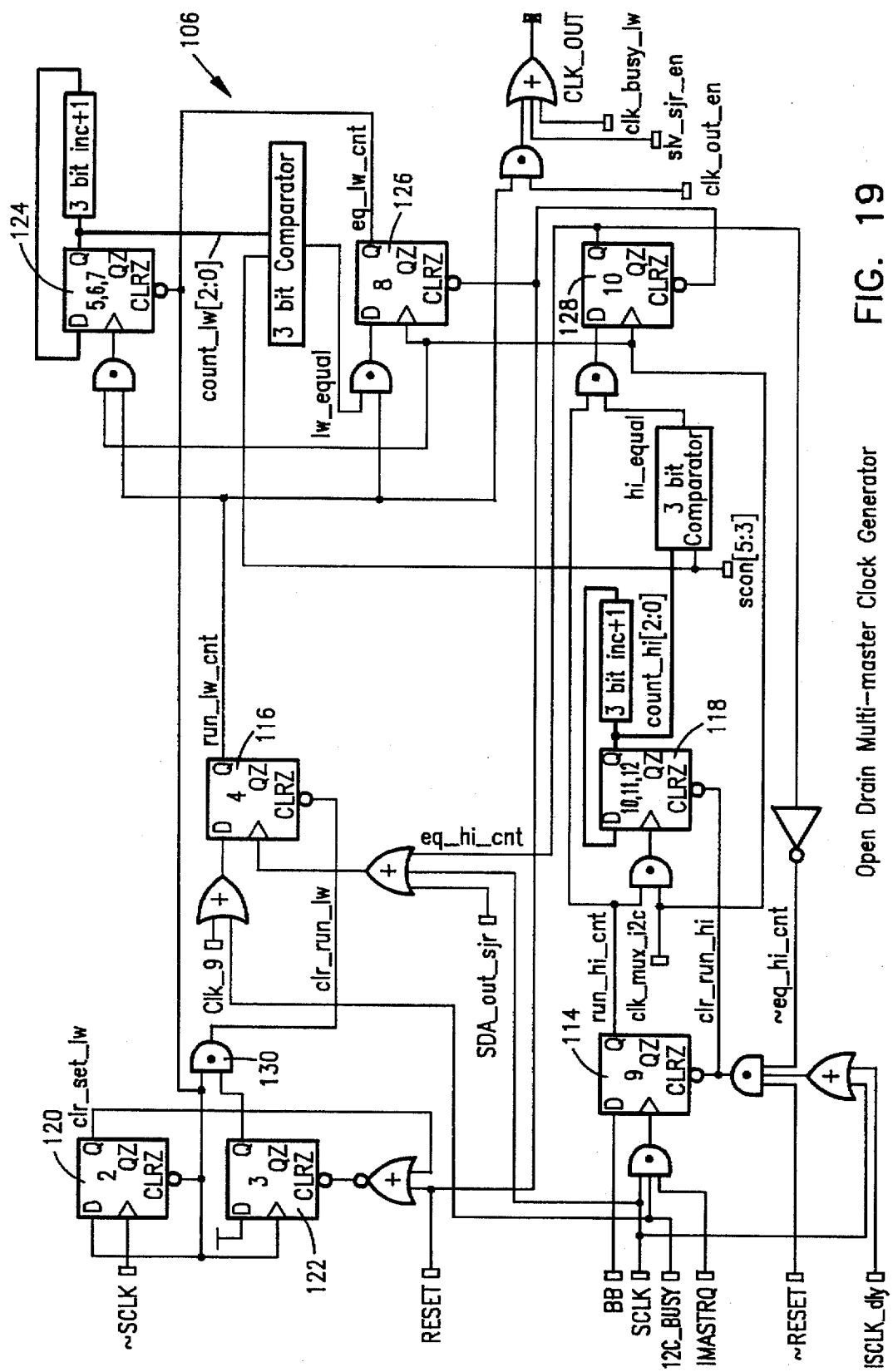
FIG. 19 is a schematic diagram illustrating another clock generation circuit which may be used in the serial interface shown in FIGS. 1 and 2.
Figure 20:
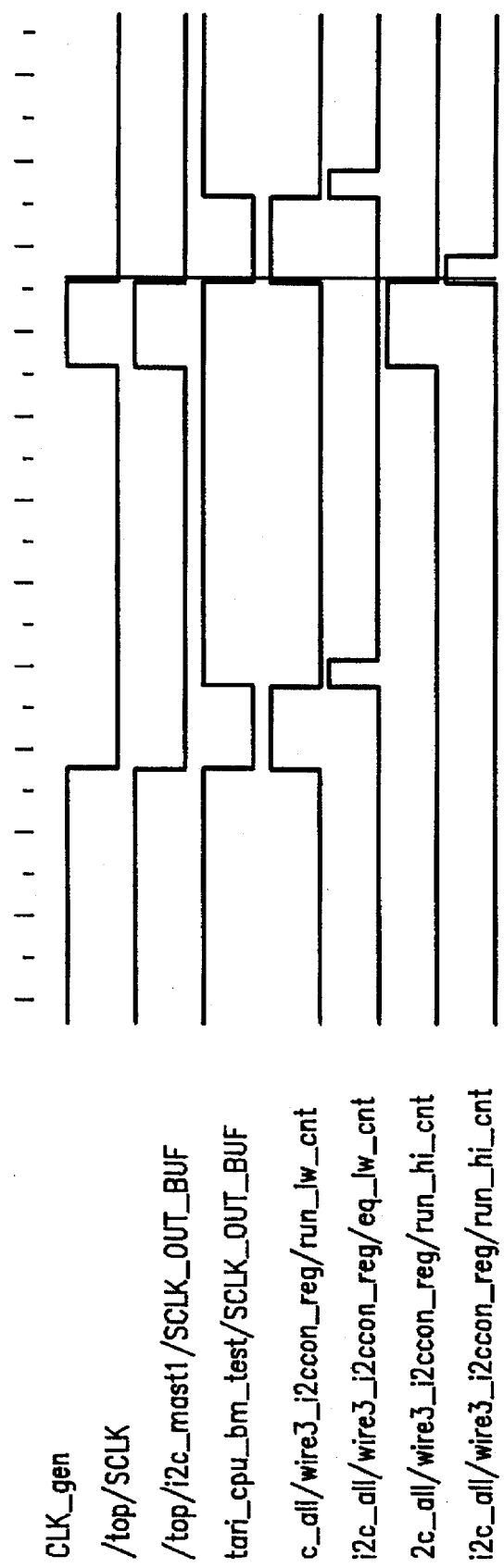
FIGS. 20–21 are timing diagrams illustrating the operation of the clock generation circuit shown in FIG. 19.
Figure 21:
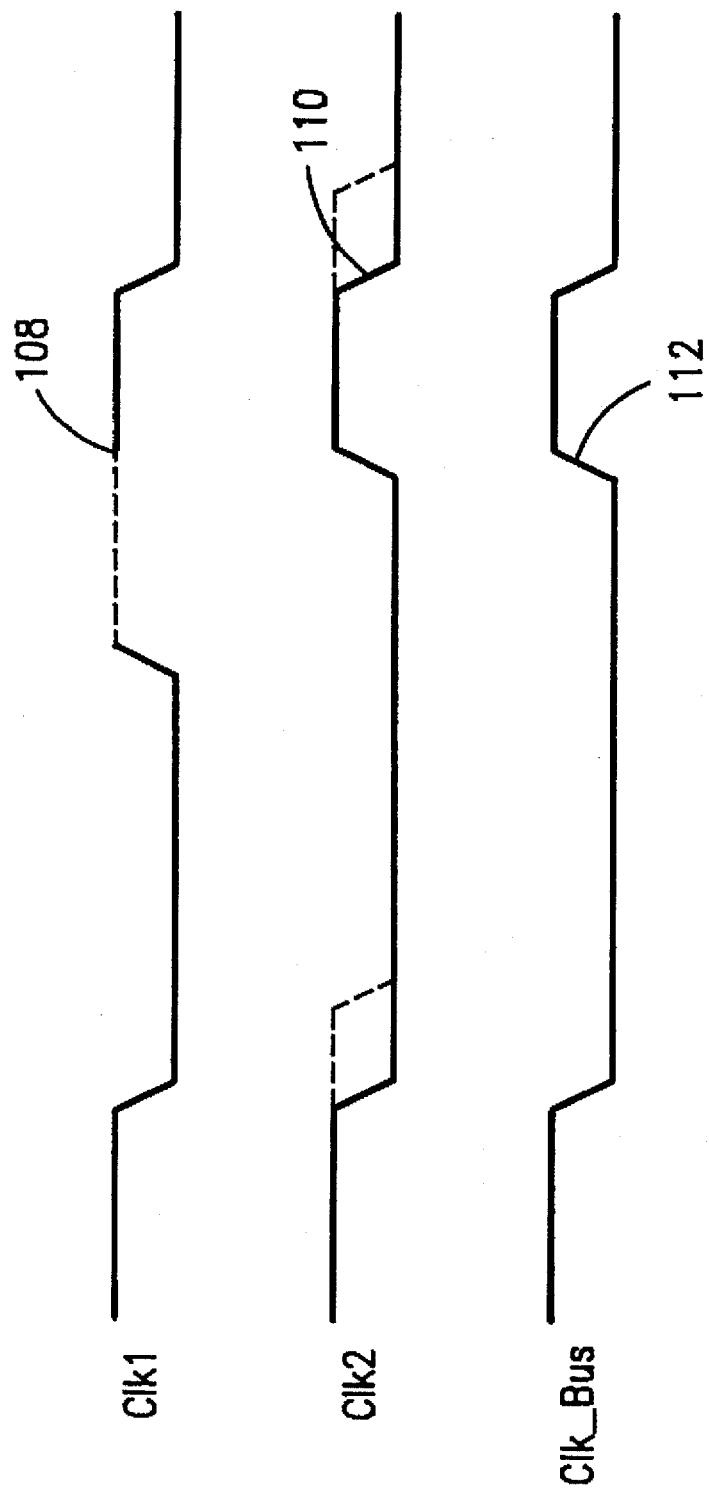

FIG. 19 illustrates an open drain, multi source, glitch free clock generation circuit 106 which overcomes the disadvantage of the circuit 104 shown in FIG. 16. FIGS. 20–21 illustrate the operation of the clock generation circuit 106. The clock generation circuit 106 is a digital circuit which drives an open-drain multi-source clock signal that guarantees minimum clock width and glitch free. This is used to synchronize all devices connected to this clock signal.

In the clock generation circuit 106, there are two counters used to generate the clock in the design. One is a high count for high pulse width and another is a low count for low pulse width. At the falling edge of CLK_BUS, i.e., when a falling edge is detected on the I²C serial clock, or when the high counter expires (count off to zero, or count up to a desired number), circuitry will pull its own clock low and start counting off low count until the low count expires and the high count is reset. The CLK_BUS is held low until the low count expires. However, the low to high transition of this clock may not change the state of CLK_BUS if another clock still low.

At the rising edge of CLK_BUS, circuitry will start counting off high counter 108 until it expires or CLK_BUS goes low. The count needs to be reset 110 or reloaded when CLK_BUS changes state. CLK_BUS is generated with its low period determined by the device with the longest clock period and its high period determined by the one with the shortest clock high period. In this way, if all of the clocks guarantee minimum high pulse width, the clocks in the open-drain bus will be synchronized and guarantee minimum high pulse width and glitch free.

When all devices expire their low count, CLK_BUS will go high and all clock's high count starts counting. The first device to complete the HIGH period will pull CLK_BUS low and every clock resets high count, and low count starts. Again, the CLK_BUS high period is determined by the one with the shortest clock high period and the low period is determined by the device with longest clock low period. As long as every device does not violate the clock pulse specification, CLK_BUS will violate it either.

Thus, with the clock generation circuit 106, the resulting system clock will always have the shortest high and the longest low of the clk1 and clk2 clock signals. It operates in open drain, and guarantees the minimal high pulse width. The smallest pulse width is normally set in order to satisfy the minimal high pulse width for I²C. It should be understood, however, that the use of the clock generation circuit 106 is not limited to I²C. In other words, the clock generation circuit 106 guarantees the minimal clock high pulse width of whatever data transfer specification is being used. The resulting system clock low will be the longest low of clk1 and clk2, and the resulting system clock high will be the shortest high. So normally the shortest high to satisfy the specification being used is chosen. The clock generation circuit 106 may be used in any application with open drain and is not limited to I²C.

Referring to FIG. 19, the clock generation circuit 106 includes two increment counters: a first counter for count system SCLK high period and a second counter for count system SCLK low period (for when the generator clock duty cycle is to be other than 50%). The prescaled clock clk_mux_i2c, which is already divided down by 4, 8, 16 or 32 depending upon the bits [7:6] in the SCON register, goes to the second counter. If the signal run_hi_cnt is set to a "1," then the three bit high count will start incrementing until the number in bits [5:3] in the SCON register is reached (if eq_hi_cnt is set to 1), or the system SCLK goes low (another master is driving the clock in the I²C clock bus).

When SCLK is detected as low, the high count must be reset and the low counted started to keep synchronization with system SCLK.

Upon the SCLK transition from high to low, or when eq_hi_cnt is set to a "1" (i.e., high count reaches scon register [5:3]), or a start condition has just been generated by Elenetari_i2c, the low count will start counting and the system will drive the CLK_OUT signal low and the system SCLK will be low. It will count low until it expires (i.e., the count reaches SCON register bits [5:3] and eq_lw_cnt is generated). When it has expired, the system will stop driving a "0" out in the CLK_OUT line.

When the system stops driving a "0" in the CLK_OUT line, other potential masters in the arbitration cycle may still drive "0" in the CLK_OUT line. SCLK may still be low at this time. Both high and low count counters are idle during this period until the system SCLK has a low to high transition. The circuitry used to detect this event, if the system is currently active, will generate the signal run_hi_cnt and the high count will start counting. High count will be cleared by the signal eq_hi_cnt, or by RESET, or by the falling edge of SCLK.

When the SCLK signals goes from low to high, this indicates that the SCLK clock is not being driven low any more. Every current master then counts high count for SCLK high pulse width. The SCLK low to high transition will pull the signal run_hi_cnt high in register 114 if the signal I2C_BUSY is set. The signal run_hi_cnt will gate with clk_mux_i2c to increment the high count register 118. At every rising edge of clk_mux_i2c, if run_hi_cnt is high, the counter will increment by one until it is equal to bits [5:2] of the SCON register. When bits [5:2] of the SCON register are equal, the D input of register 1 is one and the signal eq_hi_cnt goes to one. This signal also clears the high count to all zeros and clears the signal run-hi_cnt to a "0".

In the register 114, the CLR signal is not only affected by the signal eq_hi_cnt, it is also affected by the falling edge of SCLK. If the system high count does not reach bits [5:3] of the SCON register, the outside master starts driving low in SCLK, and the system will clear the high count to synchronize with the system SCLK. That is why the signal clr_run_hi is also generated by SCLK's falling edge.

The two register DFFC 120 and 122, and the shown combinational logic, generate the clear signal clr_run_lw to clear the signal run_lw_cnt and stop the low count. IF the signal eq_lw_cnt is set to a "1", the rising edge will set the signal set-lw to a "1", and the AND gate 130 will set the signal clr_run_lw to a "1", causing the signal run-lw_cnt generated by register 116 to clear to a "0". The low count clock signal clk_mux_i2c, which is a prescaled clock from the divide down chain AND with the signal run-lw_cnt, is gated off the clock to stop the run low count from counting. The low count 124 will also be cleared by the signal eq_lw_cnt.

The signal eq_lw_cnt is generated by register 126. At the rising edge of the signal clk_mux_i2c, if the signal run_lw_cnt is high, the low count 124 will be incremented by one. If the output of the count (count_lw[2:0]) is equal to bits [5:3] of the SCON register, the D input to register 126 will be a "1". At the rising edge of the signal clk_mux_i2c, the signal eq_lw_cntl will be a "1" also. At the next rising edge of the signal clk_mux_i2c, since the low count has been cleared, the D input in register 126 is also cleared so as to clear the signal eq_lw_cnt.

The final output clock CLK_OUT is also affected by other circumstances. If the signal I2C_BUSY is not set, which indicates that the system is not ready for the next transition, the output clock CLK_OUT will also hold low. In view of the signals run_lw_cnt and I2C_BUSY, the system will drive the output CLK_OUT low to the system. Because the system clock is an open drain connected with a pull up resistor, if it is not driven low, it will default to high.

Referring again to FIG. 15, there are two state machines in the design. One is the mode state machine coded as "one_hot". If the mode state machine is in the T_IDLE state, the state machine will stay in idle mode also. When the mode state machine changes to any state, it will invoke this state machine to go to T_clk_1. Every SCLK_I2C will go to another state, except for clk_1 when in the repeat start condition (Sr). When this occurs, clk_1 will stay for another clock.

At the first data byte transfer, the 8th clock associated data indicates whether the next cycle is a read or write type. The 9th clock is an acknowledge clock, and the receiver needs to pull data low to acknowledge. cLk8_9 is generated by sampling clk_8 at the falling edge of SCLK_I2C. Transmit uses this pulse to release the data bus and the slave uses it to pull the data line low. The clock will set out when in master mode and AR=0. The clock will hold low in master mode but I2C BUSY is low. In the slave mode, if I2C_BUSY is low, it will stretch the clock to low.

The Own Address Register is a write/read register having an I/O map address of 0056h. The bit assignments are as follows. Bit 7 is reserved. Bits 6–0 are loaded with the 7-bit Access.bus address. When addressed as a slave, the first 7-bit transferred will compare with this register to determine if this device is being called.

Figure 22:
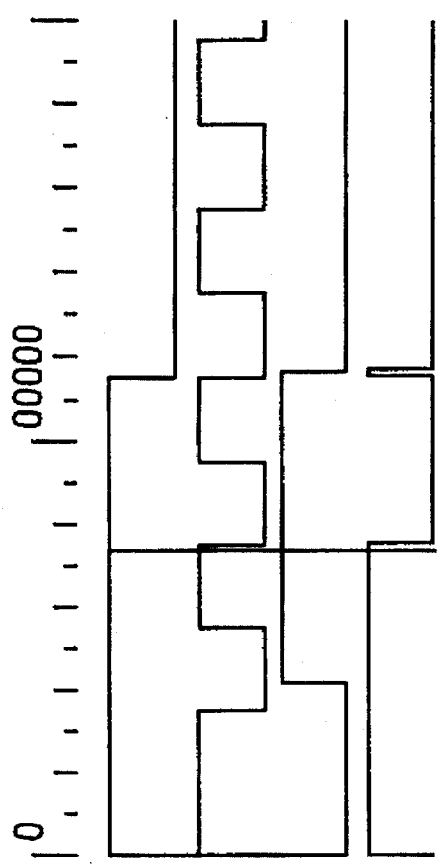
FIGS. 22–23 are timing diagrams illustrating the operation of the serial interface shown in FIGS. 1 and 2.

The module which generates the data shift register and the own address register also generates the START, STOP, and Sr conditions and provides data setup hold timing. Referring to FIG. 22, the start condition usually needs a 4 usec minimum hold time. Half of the SCLK_I2C_CON signal (continue running clock with max frequency=100 k) is 5 us. This clock is used as a reference to guarantee minimum hold time. At the rising edge, it samples MASTRQ. If MASTRQ is high, the data line will be pulled low following the negative edge for half a clock cycle and then release it The clock will pull low after that and start to synchronize clock generation.

Figure 23:
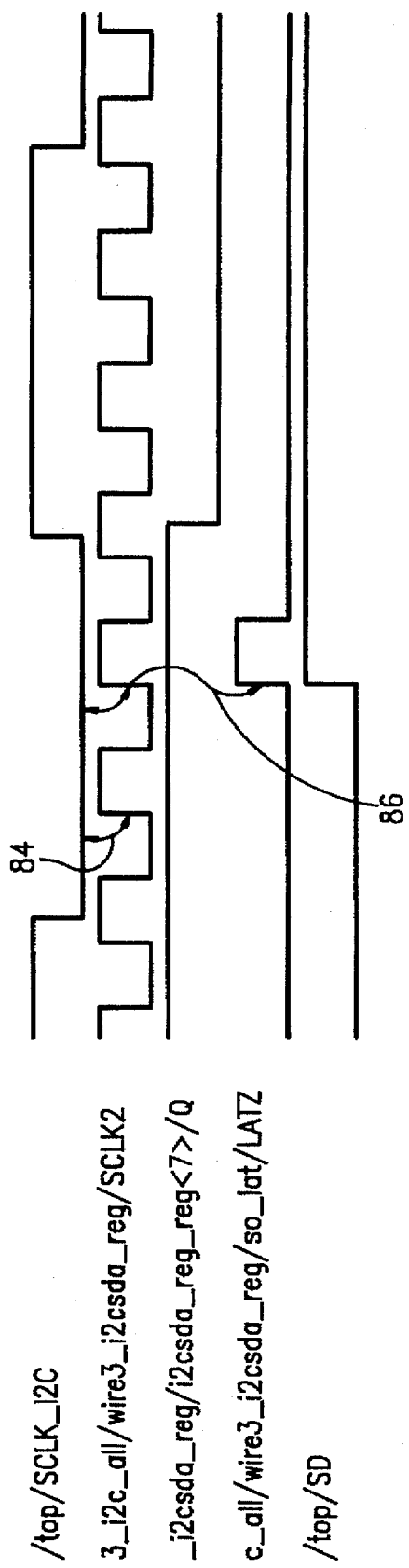

Referring to FIG. 23, the data hold timing requires 300 ns. One period divided by 8 clock cycles (t=8/25 MHZ=320 ns) will provide 320 ns. At the rising edge 84 it samples the I2C serial clock SCLK_I2C. At a second rising edge 86 if it samples low, it will open the output latch and let SMB out. Data is guaranteed a 320–640 ns hold in this way.

Before generating a STOP condition, data should be pulled low first, then released high when SCLK_I2C is high. At the 9th negative edge of SCLK_I2C, if STOP_W is high or NO_akc is high, data will be pulled low and held low until 4.7 us minimum hold time is met after the clock goes high. Data will be pulled low at clk8_9 if in MR/SR mode and no error is detected to send acknowledge out. Data will drive by shift register MSB if in MT/ST mode from clk_1 to clk_8.

Figure 24:
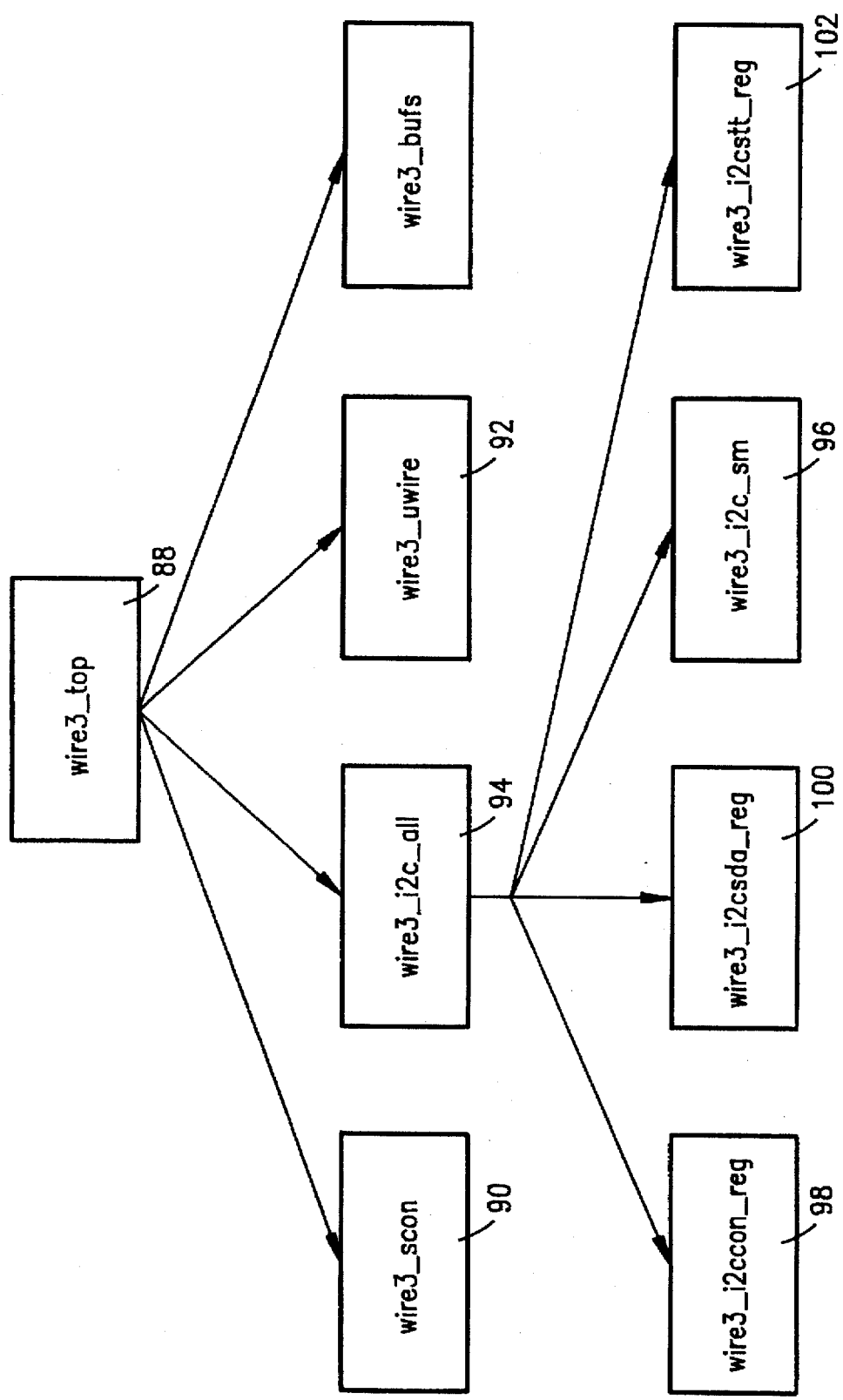
FIG. 24 is a block diagram illustrating modules included in the serial interface shown in FIGS. 1 and 2.
Figure 25:
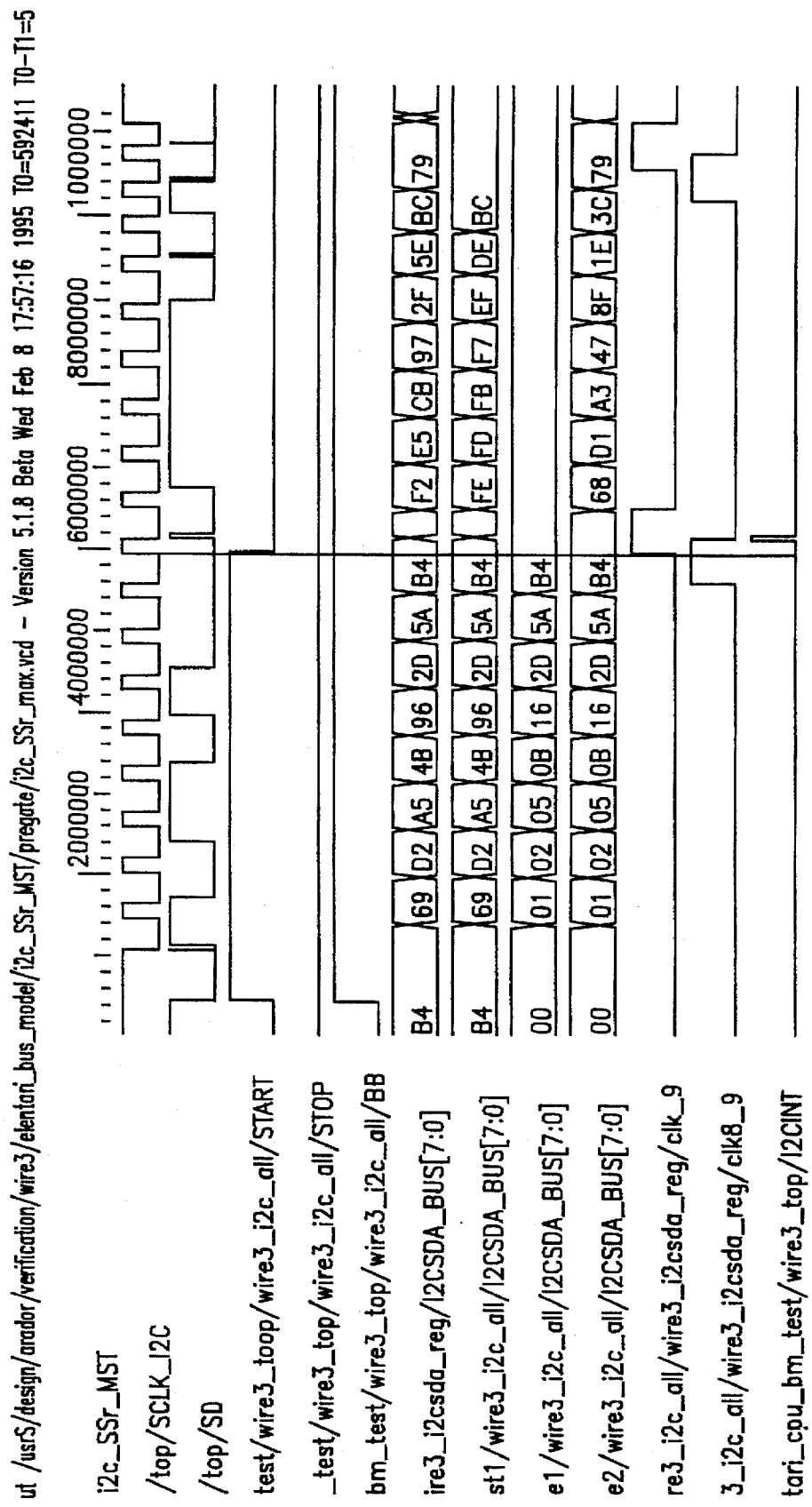
Figure 26:
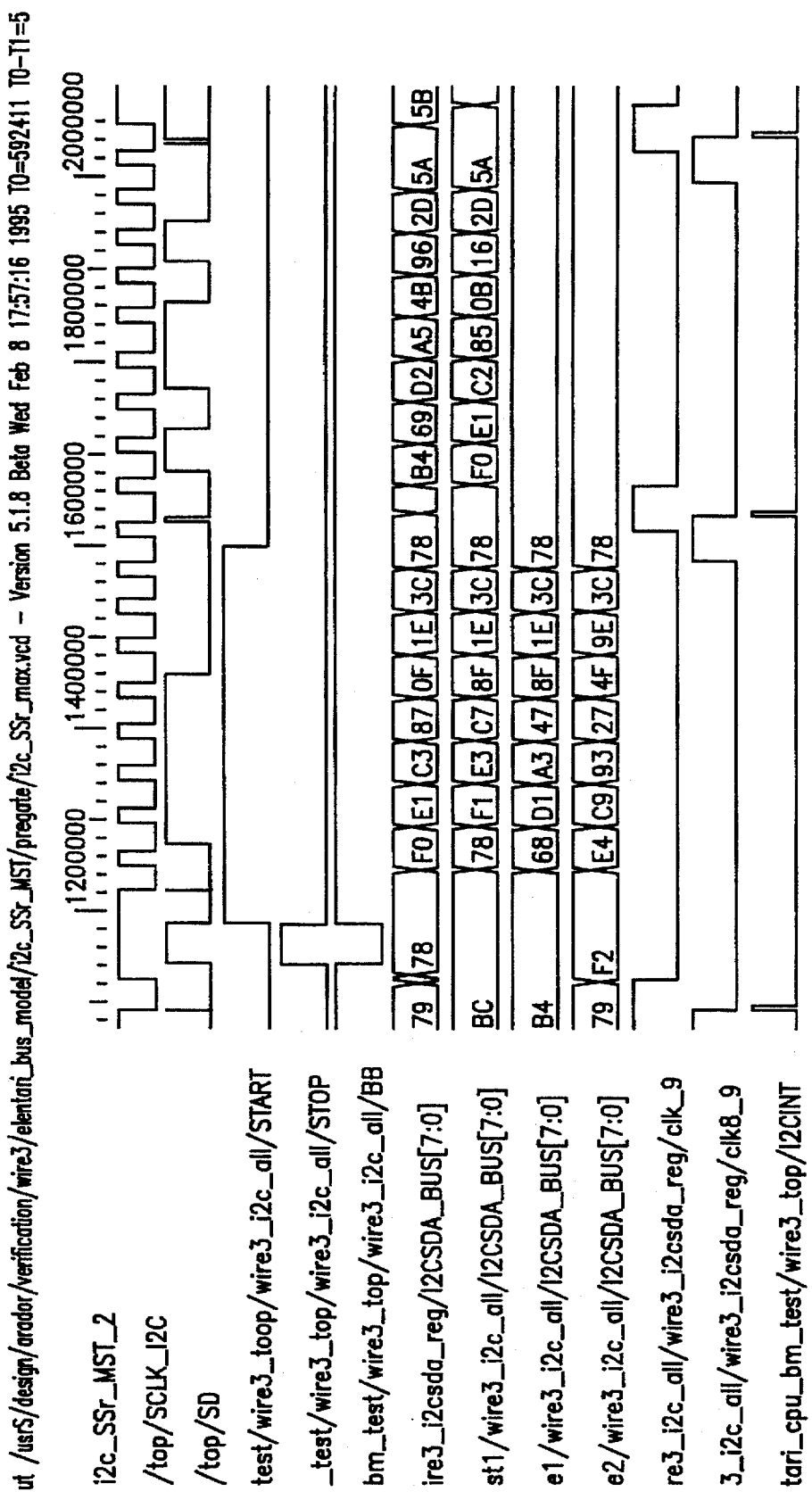
Figure 27:
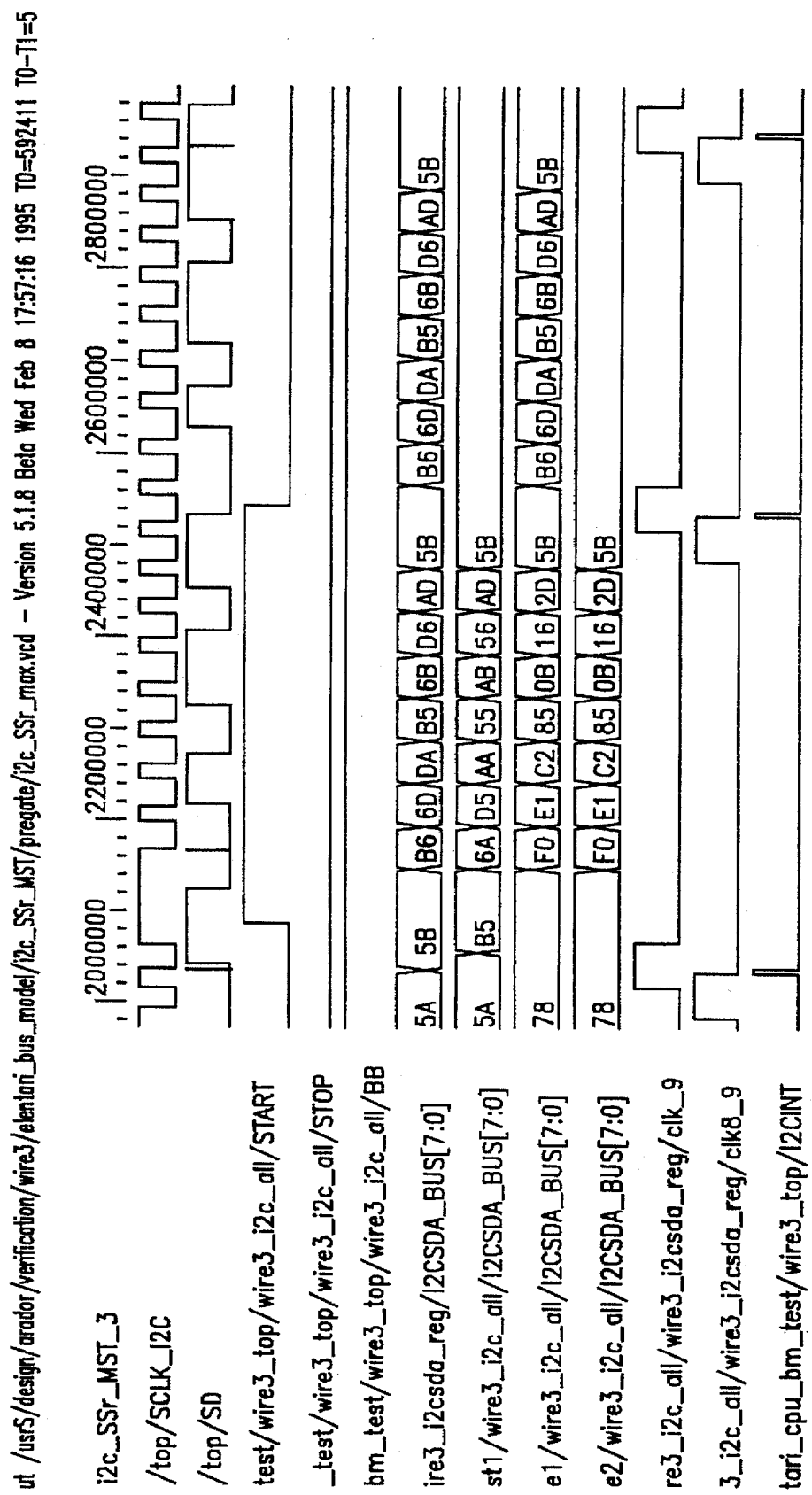
Figure 29:
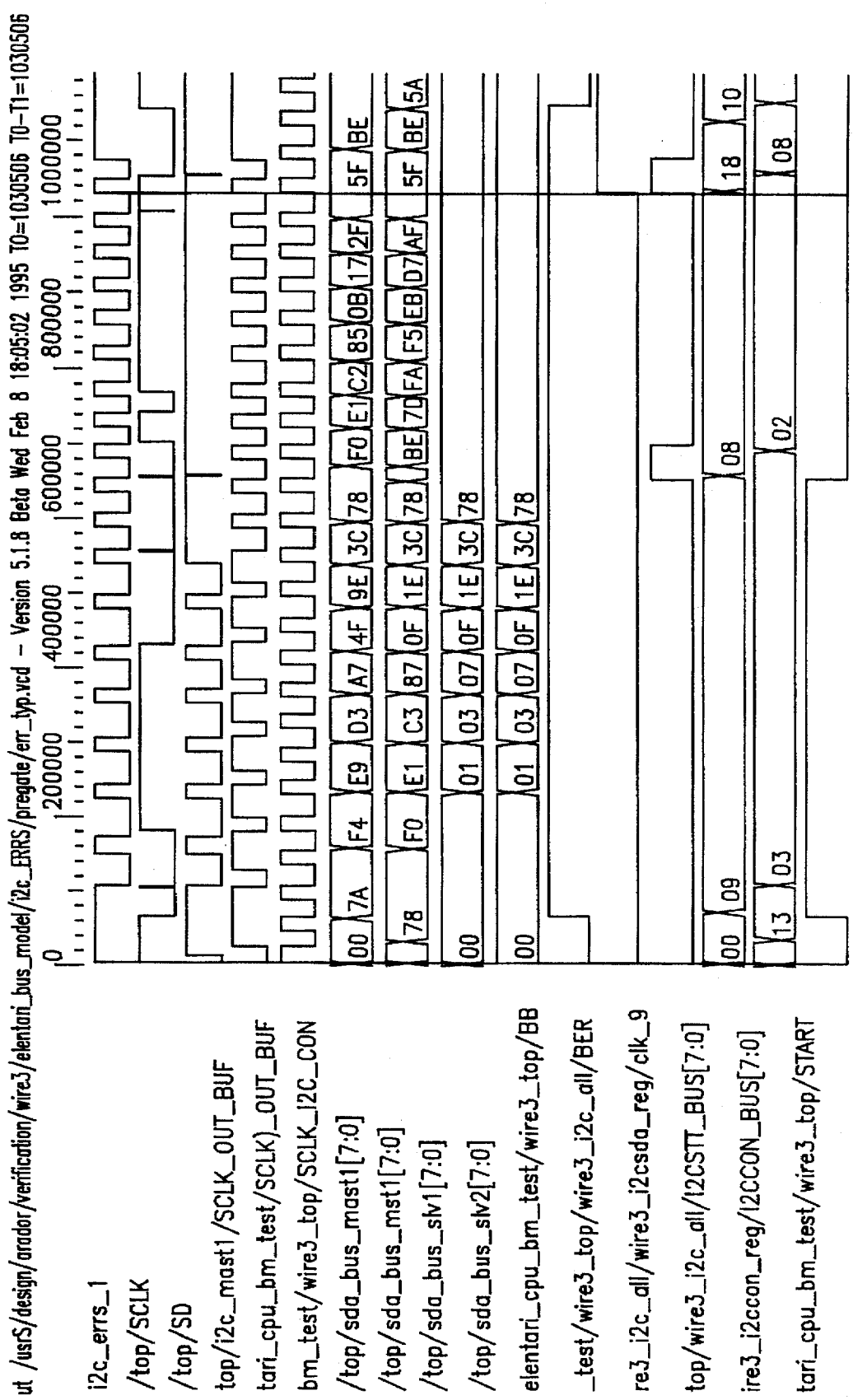

Referring to FIG. 24, the top module wire3_top 88 extantiates the following three modules: wire3_scon 90, wire3_uwire 92, and wire3_i2e_all 94. The wire3_i2c_all 94 module extantiates all I²C modules, namely, wire3_i2c_sm 96, wire3_i2ccon_reg 98, wire3_i2csda_reg 100, and wire3_i2cstt_reg 102.

The invention described herein can be simulated as slave1, slave2 and mast1. The IC chip 32 is connected with the BIU bus module 40 and the CPU 34. Slave1, slave2 and master may be programmed by a Verilog task. In this way, when the IC chip 32 is simulated to be a master, the slave may respond. During a scon_test, the following procedure may be followed. First, generate all read/write strobes. program scon register and watchdog function test. Check clock divide down logic and check divide down combinations. During the i2c_SSr_MST test, MT, MR modes are tested. Start, STOP and Sr are generated for the iC chip 32. Test MT, arbitration loss, SR, ST for mast1 and test SR, ST for slave1 for the IC chip 32.

Both the IC chip 32 and mast1 will issue START together. Both send "B4" out, and call slave2(5a)=>MT. Slave2 responds by sending acknowledge back, and the Slave goes to Idle. The IC chip 32 sends "79" out, sets STOP_W, and mast1 sends "7A" and loses arbitration at the 7th bit, and then goes to idle=>MT. STOP is generated after the 9th clock. Start is generated again, and send "78" out call mast1(3C)=>MT. Mast1 responds with acknowledge back.

As discussed above, the serial interface 30 has only three signal pins. The SCLK (or SCL) pin is the clock pin. In MICROWIRE mode, this pin is configured as input in slave mode and as output in master mode. In Access.bus, it is bidirectional. The SO (or SDA) pin is the data out DO pin. It is configured as an output in MICROWIRE mode and as a bidirectional pin in Access.bus mode. The SI pin is the data in DI pin. It is an input in MICROWIRE mode, and is not used in Access.bus mode.

With respect to programming the serial interface 30, when programming the Repeat Start (Sr), if the current bus master wants to continue to use the Access.Bus to talk to another slave without possible arbitration, then Sr can be used. Specifically, a) after the current transfer is finished (BUSY=O, ABINT=1), set MASTRQ=1 for repeat start; b) set BUSY, clear ABINT; and, c) Program SDA (Data Register).

During an Access.bus transfer, the SDA register is normally not written to because the transferred data will be corrupted. The SCON (System Register) clock divide chain is normally not reprogrammed between byte transfers. The SDA register is normally programmed after MICROWIRE is enabled. If the IC chip 32 is in MICROWIRE slave mode, BUSY needs to be set early to wait for the Master to start a transfer. The internal clock (from the divide chain) needs to be programmed faster (through the SCON Register) to synchronize BUSY. STOP_W is usually set before the last transfer finishes. STOP_W may be set before the last byte transfer starts.

FIGS. 25–29 are timing diagrams which illustrate the operation of the serial interface 30.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA", (still pending); U.S. patent application Ser. No. 08/451,965, entitled "SERIAL INTERFACE CAPABLE OF OPERATING IN TWO DIFFERENT SERIAL DATA TRANSFER MODES", (still pending); U.S. patent application Ser. No. 08/453,076, entitled "HIGH PERFORMANCE MULTIFUNCTION DIRECT MEMORY ACCESS (DMA) CONTROLLER", (still pending); U.S. patent application Ser. No. 08/452,001, entitled "OPEN DRAIN MULTI-SOURCE CLOCK GENERATOR HAVING MINIMUM PULSE WIDTH", (still pending); U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION", (still pending); U.S. patent application Ser. No. 08/451,924, entitled "EXECUTION UNIT ARCHITECTURE TO SUPPORT x86 INSTRUCTION SET AND x86 SEGMENTED ADDRESSING", (still pending); U.S. patent application Ser. No. 08/451,444, entitled "BARREL SHIFTER", (still pending); U.S. patent application Serial No. 08/451,204, entitled "BIT SEARCHING THROUGH 8, 16, OR 32-BIT OPERANDS USING A 32-BIT DATA PATH", (still pending); U.S. patent application Serial No. 08/451,195, entitled "DOUBLE PRECISION (64-BIT) SHIFT OPERATIONS USING A 32-BIT DATA PATH", (still pending); U.S. patent application Ser. No. 08/451,571, entitled "METHOD FOR PERFORMING SIGNED DIVISION", (still pending); U.S. patent application Ser. No. 08/452,162, entitled "METHOD FOR PERFORMING ROTATE THROUGH CARRY USING A 32-BIT BARREL SHIFTER AND COUNTER", (still pending); U.S. patent application Ser. No. 08/451,434, entitled "AREA AND TIME EFFICIENT FIELD EXTRACTION CIRCUIT", (still pending); U.S. patent application Ser. No. 08/451,535, entitled "NON-ARITHMETICAL CIRCULAR BUFFER CELL AVAILABILITY STATUS INDICATOR CIRCUIT", (still pending); U.S. patent application Ser. No. 08/445,563, entitled "TAGGED PREFETCH AND INSTRUCTION DECODER FOR VARIABLE LENGTH INSTRUCTION SET AND METHOD OF OPERATION", (still pending); U.S. patent application Ser. No. 08/450,153, entitled "PARTITIONED DECODER CIRCUIT FOR LOW POWER OPERATION", (now U.S. Pat. No. 5,546,353); U.S. patent application Ser. No. 08/451,495, entitled "CIRCUIT FOR DESIGNATING INSTRUCTION POINTERS FOR USE BY A PROCESSOR DECODER", (still pending); U.S. patent application Ser. No. 08/451,219, entitled "CIRCUIT FOR GENERATING A DEMAND-BASED GATED CLOCK", (now U.S. Pat. No. 5,598,112); U.S. patent application Ser. No. 08/451,214, entitled "INCREMENTOR/DECREMENTOR", (now U.S. Pat. No. 5,583,453); U.S. patent application Ser. No. 08/451,150, entitled "A PIPELINED MICROPROCESSOR THAT PIPELINES MEMORY REQUESTS TO AN EXTERNAL MEMORY", (still pending); U.S. patent application Ser. No. 08/451,198, entitled "CODE BREAKPOINT DECODER", (still pending); U.S. patent application Ser. No. 08/445,569, entitled "TWO TIER PREFETCH BUFFER STRUCTURE AND METHOD WITH BYPASS", (still pending); U.S. patent application Ser. No. 08/445,564, entitled "INSTRUCTION LIMIT CHECK FOR MICROPROCESSOR", (still pending); U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE", (still pending); U.S. patent application Ser. No. 08/452,080, entitled "APPARATUS AND METHOD FOR EFFICIENT COMPUTATION OF A 486™ MICROPROCESSOR COMPATIBLE POP INSTRUCTION", (still pending); U.S. patent application Ser. No. 08/450,154, entitled "APPARATUS AND METHOD FOR EFFICIENTLY DETERMINING ADDRESSES FOR MISALIGNED DATA STORED IN MEMORY", (still pending); U.S. patent application Ser. No. 08/451,742, entitled "METHOD OF IMPLEMENTING FAST 486™ MICROPROCESSOR COMPATIBLE STRING OPERATION", (still pending); U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID", (still pending); U.S. patent application Ser. No. 08/451,507, entitled "DRAM CONTROLLER THAT REDUCES THE TIME REQUIRED TO PROCESS MEMORY REQUESTS", (still pending); U.S. patent application Ser. No. 08/451,420, entitled "INTEGRATED PRIMARY BUS AND SECONDARY BUS CONTROLLER WITH REDUCED PIN COUNT", (still pending); U.S. patent application Ser. No. 08/452,365, entitled "SUPPLY AND INTERFACE CONFIGURABLE INPUT/OUTPUT BUFFER", (now U.S. Pat. No. 5,612,637); U.S. patent application Ser. No. 08/451,744, entitled "CLOCK GENERATION CIRCUIT FOR A DISPLAY CONTROLLER HAVING A FINE TUNEABLE FRAME RATE", (still pending); U.S. patent application Ser. No. 08/451,206, entitled "CONFIGURABLE POWER MANAGEMENT SCHEME", (still pending); U.S. patent application Ser. No. 08/452,350, entitled "BIDIRECTIONAL PARALLEL SIGNAL INTERFACE", (still pending); U.S. patent application Ser. No. 08/452,094, entitled "LIQUID CRYSTAL DISPLAY (LCD) PROTECTION CIRCUIT", (still pending); U.S. patent application Ser. No. 08/450,156, entitled "DISPLAY CONTROLLER CAPABLE OF ACCESSING GRAPHICS DATA FROM A SHARED SYSTEM MEMORY", (still pending); U.S. patent application Ser. No. 08/450,726, entitled "INTEGRATED CIRCUIT WITH TEST SIGNAL BUSES AND TEST CONTROL CIRCUITS", (now U.S. Pat. No. 5,541,935); U.S. patent application Ser. No. 08/445,568, entitled "DECODE BLOCK TEST METHOD AND APPARATUS", (still pending).

It should be understood that various alternatives to the embodiments of the invention described herein may be employed in practicing the invention. It is intended that the following claims define the scope of the invention and that structures and methods within the scope of these claims and their equivalents be covered thereby.

What is claimed is:

1. A serial interface, comprising:
    a first port capable of transmitting and receiving data in a serial fashion;
    a first p-channel transistor coupled to the first port;
    a first n-channel transistor coupled to the first port;
    a first control circuit coupled to the first p-channel transistor and the first n-channel transistor for disabling the first p-channel transistor and enabling the first n-channel transistor so that the first port operates in a first serial data transfer mode in which the first n-channel transistor operates in an open-drain fashion;
    a second port capable of transmitting and receiving a clock signal which is used to control data transfer through the first port;
    a second p-channel transistor coupled to the second port;
    a second n-channel transistor coupled to the second port; and
    a second control circuit coupled to the second p-channel transistor and the second n-channel transistor for disabling the second p-channel transistor and enabling the second n-channel transistor so that the second port operates in a first clock transmission mode in which the second n-channel transistor operates in an open-drain fashion.

2. A serial interface in accordance with claim 1, wherein the first control circuit enables the first p-channel transistor and the first n-channel transistor so that the first port operates in a second serial data transfer mode in which the first n-channel transistor and the first p-channel transistor operate in a totem pole fashion.

3. A serial interface in accordance with claim 1, wherein the second control circuit enables the second p-channel transistor and the second n-channel transistor so that the second port operates in a second clock transmission mode in which the second n-channel transistor and the second p-channel transistor operate in a totem pole fashion.

4. A serial interface in accordance with claim 1, further comprising:
    a third port for performing serial data transfer; and
    a third control circuit coupled to the third port for enabling the third port to operate in a -second-serial-data-transfer-mode.

5. A serial interface, comprising:
    a first port through which data is transmitted and received in a serial fashion;
    a first transistor coupled to the first port and configured to charge the first port;
    a second transistor coupled to the first port and configured to discharge the first port; and
    a first control circuit coupled to the first and second transistors and configured to operate the first and second transistors in a first serial data transfer mode in which the first transistor is disabled and the second transistor is enabled;
    a second port through which a clock signal is transmitted and received;
    a third transistor coupled to the second port and configured to charge the second port;
    a fourth transistor coupled to the second port and configured to discharge the second port; and
    a second control circuit coupled to the third and fourth transistors and configured to operate the third and fourth transistors in a first clock transmission mode in which the third transistor is disabled and the fourth transistor is enabled and a second clock transmission mode in which both the third and fourth transistors are enabled.

6. A serial interface in accordance with claim 5, wherein the first transistor comprises a p-channel transistor and the second transistor comprises an n-channel transistor.

7. A serial interface in accordance with claim 5, wherein the first control circuit comprises:
    a NAND gate having an output connected to the first transistor, a first input connected to receive a clock signal, a second input connected to receive a first enable signal, and a third input connected to receive a second enable signal; and
    a NOR gate having an output connected to the second transistor, a first input connected to receive the clock signal, and a second input connected to receive an inverse of the first enable signal.

8. A serial interface in accordance with claim 5, wherein the third transistor comprises a p-channel transistor and the fourth transistor comprises an n-channel transistor.

9. A serial interface in accordance with claim 5, wherein the second control circuit comprises:
    a NAND gate having an output connected to the third transistor, a first input connected to receive a clock signal, a second input connected to receive a first enable signal, and a third input connected to receive a second enable signal; and a NOR gate having an output connected to the fourth transistor, a first input connected to receive the clock signal, and a second input connected to receive an inverse of the first enable signal.

10. A serial interface in accordance with claim 5, wherein the second control circuit comprises:

a buffer that is configured to select a first clock signal for transmission in the first clock transmission mode and a second clock signal for transmission in the second clock transmission mode.

11. A serial interface in accordance with claim 5, further comprising:

a third port through which data is transmitted in a serial fashion;

a third control circuit coupled to the third port and configured to enable the third port to operate in a second serial data transfer mode.

* * * * *